(12) United States Patent
Yashima et al.

(10) Patent No.: US 12,409,506 B2
(45) Date of Patent: Sep. 9, 2025

(54) WELDING CONTROL METHOD AND WELDING CONTROL DEVICE FOR PORTABLE WELDING ROBOT, PORTABLE WELDING ROBOT, AND WELDING SYSTEM

(71) Applicants: KOBE STEEL, LTD., Kobe (JP); KOBELCO ROBOTIX Co., Ltd., Fujisawa (JP)

(72) Inventors: Takashi Yashima, Kanagawa (JP); Masaru Kodama, Kanagawa (JP); Shinobu Toda, Kanagawa (JP); Hirofumi Kawasaki, Kanagawa (JP)

(73) Assignees: KOBE STEEL, LTD., Kobe (JP); KOBELCO ROBOTIX Co., Ltd., Fujisawa (JP)

( * ) Notice: Subject to any disclaimer, the term of this patent is extended or adjusted under 35 U.S.C. 154(b) by 898 days.

(21) Appl. No.: 17/630,877

(22) PCT Filed: Mar. 17, 2020

(86) PCT No.: PCT/JP2020/011678
§ 371 (c)(1),
(2) Date: Jan. 27, 2022

(87) PCT Pub. No.: WO2021/024540
PCT Pub. Date: Feb. 11, 2021

(65) Prior Publication Data
US 2022/0297218 A1    Sep. 22, 2022

(30) Foreign Application Priority Data
Aug. 7, 2019 (JP) ................. 2019-145780

(51) Int. Cl.
*B23K 9/127* (2006.01)
*B23K 9/095* (2006.01)

(52) U.S. Cl.
CPC .............. *B23K 9/127* (2013.01); *B23K 9/095* (2013.01)

(58) Field of Classification Search
CPC .......... B23K 9/12; B23K 9/127; B23K 9/095; B23K 9/0213
See application file for complete search history.

(56) References Cited

U.S. PATENT DOCUMENTS

2020/0198041 A1*  6/2020  Nishida ................ B23K 9/0956

FOREIGN PATENT DOCUMENTS

| JP | 64-83375 A | 3/1989 |
|----|-----------|--------|
| JP | 9-182962 A | 7/1997 |

(Continued)

OTHER PUBLICATIONS

International Search Report and Written Opinion issued May 12, 2020 in PCT/JP2020/011678 filed Mar. 17, 2020, 6 pages.

*Primary Examiner* — Brian W Jennison
(74) *Attorney, Agent, or Firm* — Oblon, McClelland, Maier &Neustadt, L.L.P.

(57) ABSTRACT

In this welding control method for a portable welding robot that moves along a guide rail, for using the portable welding robot to weld a workpiece including a groove: a groove shape detection position is established in at least one location in a welding sector extending from a welding starting point to a welding end point; the groove shape at a groove shape detection position $P_n$ is sensed by means of a detecting means of the portable welding robot, which is moving along the guide rail; groove shape information is calculated from detection data obtained by the sensing; and a welding condition is acquired on the basis of the groove shape information.

16 Claims, 23 Drawing Sheets

(56) References Cited

FOREIGN PATENT DOCUMENTS

| | | |
|---|---|---|
| JP | 10-24370 A | 1/1998 |
| JP | 2863298 B2 | 3/1999 |
| JP | 2000-167667 A | 6/2000 |
| JP | 2004-17088 A | 1/2004 |
| JP | 4109911 B2 | 4/2008 |
| JP | 2011-62763 A | 3/2011 |
| JP | 5358464 B2 | 9/2013 |
| JP | 2018-58078 A | 4/2018 |
| JP | 2019-126819 A | 8/2019 |

\* cited by examiner

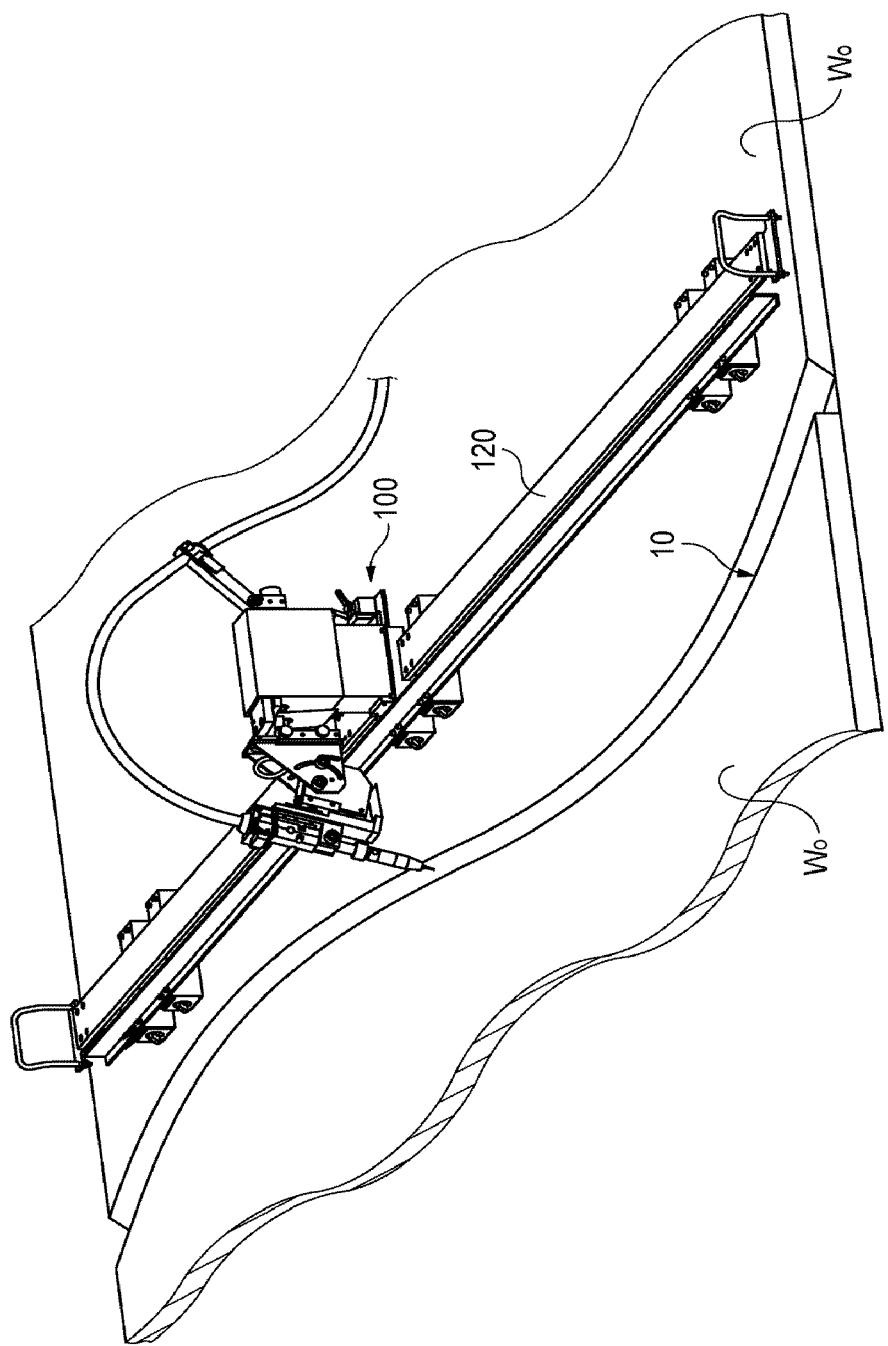

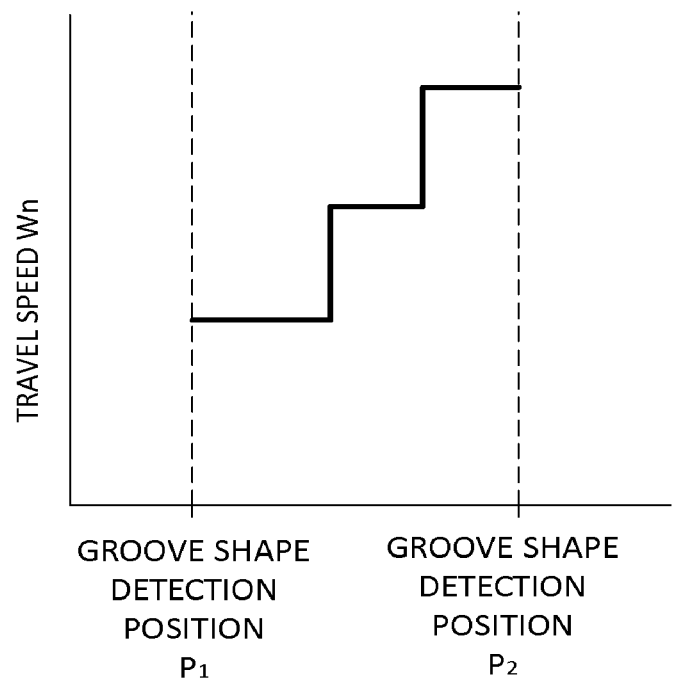
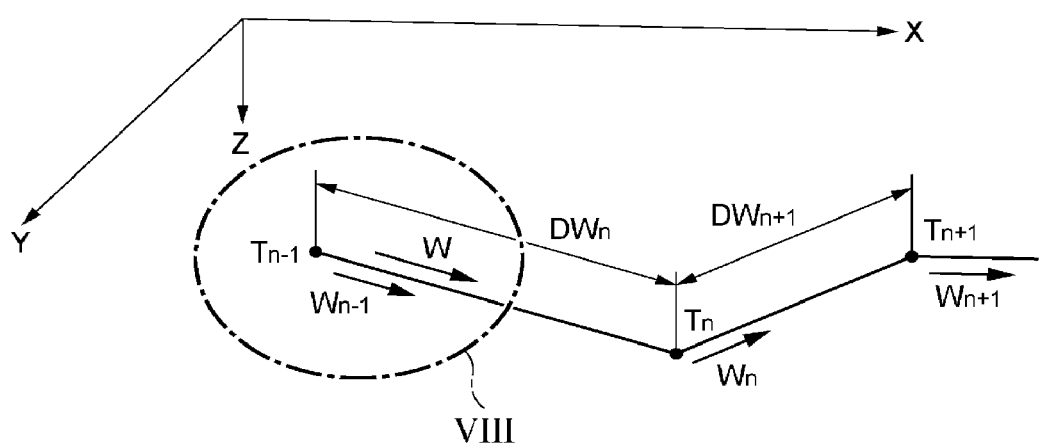

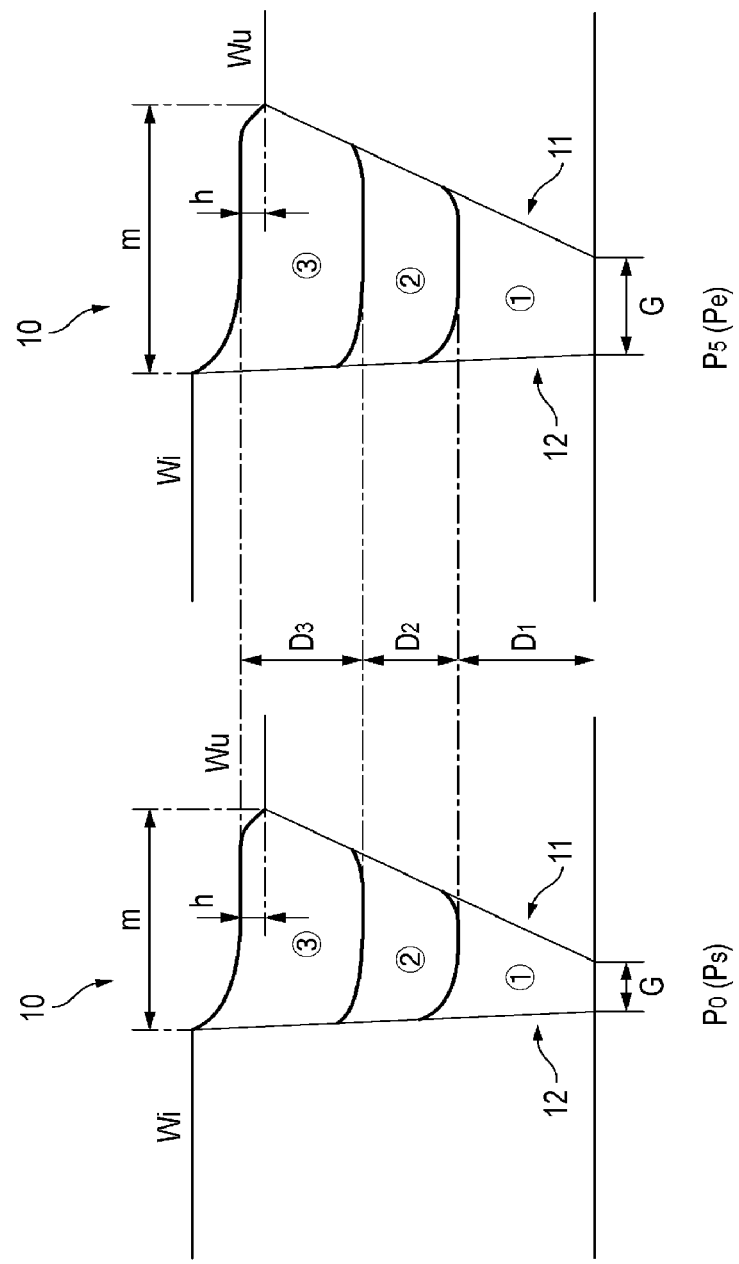

WELDING CONTROL METHOD AND WELDING CONTROL DEVICE FOR PORTABLE WELDING ROBOT, PORTABLE WELDING ROBOT, AND WELDING SYSTEM

TECHNICAL FIELD

The present invention relates to a welding control method and a welding control device of a portable welding robot capable of moving on a guide rail and automatically performing welding, the portable welding robot, and a welding system.

BACKGROUND ART

In the related art, for welding work in a factory in manufacturing a welded structure in building a ship, an iron frame, a bridge, or the like, automation has progressed and a large multi-axis welding robot is frequently used. On the other hand, in site welding work to which a large multi-axis welding robot cannot be applied, automation has been advanced from manual welding such as semi-automatic welding to a welding method to which a lightweight and small-sized portable welding robot that can be carried by one worker is applied. The application of such a portable welding robot can improve the welding efficiency at a welding site where welding has been performed manually so far.

For example, Patent Literature 1 discloses a technique to which a portable welding robot is applied. In Patent Literature 1, a guide rail using a corner unit having a linear portion and a curved portion is attached to an outer periphery of a rectangular steel pipe to be welded, the rectangular steel pipe being used in a construction site. Then, a welding robot is slidably provided on the guide rail. When a position of a curvature center of a welded portion welded by the welding robot is different from a position of a curvature center of the corner unit at a position where the welding robot is located at the time of welding the welded portion, a control unit of a control device controls a moving speed of the welding robot so that a length of a welded portion by the welding robot per unit time (travel speed) is constant. In this way, polygonal steel pipes having various shapes are efficiently welded.

CITATION LIST

Patent Literature

Patent Literature 1: JP-A-2018-58078

SUMMARY OF INVENTION

Technical Problem

However, at a site of welding, a workpiece to be welded is carried to the site along with an error from drawings due to assembly accuracy and cutting accuracy in a previous step. Thereafter, workpieces carried to the site are subjected to an assembling operation to form a groove shape serving as a weld joint. As a matter of course, an error occurs in the assembling operation. Therefore, with respect to a groove shape of a weld joint to be welded on site, a cross section of the groove shape differs depending on a portion of welding even in the same joint portion. On the other hand, in terms of welding quality, it is required that a bead width and a weld reinforcement height of the weld joint satisfy a certain reference dimension. Of course, welding defects such as undercut and overlap should not be observed. In such welding work in which the groove shape differs depending on a portion of a weld joint, in order to satisfy the welding quality, it is required that the welding robot recognizes the groove shape in advance, welding conditions are appropriately controlled in accordance with cross-sectional area of the groove shape, and a height of a weld metal in a welding groove can be kept constant over the entire welding length even when the groove shape is changed.

Further, installation of the guide rail on which the portable welding robot travels is performed manually, and a lot of time is required to install the guide rail with high accuracy. However, in the current situation, a positional relationship between the guide rail and the welding groove differs for each weld joint. At the welding site, it is necessary to check the positional relationship between the guide rail and the groove shape every time the guide rail is installed, and appropriately operate the portable welding robot based on data of the positional relationship.

In welding using a portable welding robot disclosed in Patent Literature 1, when a moving speed of the welding robot is controlled such that a length of a welded portion per unit time (that is, a travel speed) is constant along a weld joint whose groove shape changes, a height of a weld metal in a welding groove differs according to the change in the groove shape, and in the final finish, a width and a weld reinforcement height of the weld metal may deviate from a reference value according to a place, defects of undercut and overlap may be caused in an extreme case, and the welding quality may not be satisfied. Further, weldability in a case of deviation in position of the guide rail and the groove shape due to guide rail installation accuracy is not taken into consideration. It may be required to perform repair work such as removal of spatters adhering to a workpiece, and work efficiency may be significantly reduced.

The present invention has been made in view of the above-described problems, and an object of the present invention is to provide a welding control method of a portable welding robot, a welding control device, a portable welding robot, and a welding system capable of performing welding without being affected by a change in a groove shape, guide rail installation accuracy, or the like, and capable of improving work efficiency and welding quality.

Solution to Problem

The above object of the present invention is achieved by the following configuration (1) relating to a welding control method for a portable welding robot.

(1) A welding control method of a portable welding robot that moves along a guide rail for welding a workpiece having a groove, the method including:
a sensing step of setting two or more groove shape detection positions in a welding section from a welding start point to a welding end point, and sensing groove shapes at the groove shape detection positions via a detection unit provided in the portable welding robot moving on the guide rail;
a groove shape information calculation step of calculating groove shape information based on detection data obtained in the sensing step; and
a welding condition acquisition step of acquiring a welding condition based on the groove shape information.

A preferred embodiment of the present invention according to a welding control method for a portable welding robot relates to the following (2) to (11).

(2) The welding control method of the portable welding robot according to (1),
in which in a case where intersections of the groove shape detection positions and a predetermined weld line on the workpiece are set as weld line position detection points, and a trajectory of welding at a time when welding is performed between adjacent weld line position detection points is set as a welding trajectory line, the groove shape detection positions are set such that a maximum value of a relative distance between the weld line and the welding trajectory line is equal to or less than two times of a welding wire diameter.

(3) The welding control method of the portable welding robot according to (1) or (2),
in which the welding condition is controlled so as to change in at least one of a linear manner, a stepwise manner, and a curved manner between the groove shape detection positions in accordance with a value of the welding condition acquired for each of the groove shape detection positions in a case where a change in the welding condition occurs between the groove shape detection positions.

(4) The welding control method of the portable welding robot according to (3),
in which at least one welding condition is a travel speed, and
in a case where
a moving direction of the portable welding robot is set as an X direction,
a groove width direction perpendicular to the X direction is set as a Y direction, and
a groove depth direction perpendicular to the X direction is set as a Z direction,
moving speeds in three directions of the X direction, the Y direction, and the Z direction are calculated according to values of the travel speed that are acquired for the three directions at the groove shape detection positions, and
the travel speed between the groove shape detection positions is controlled according to moving speeds in the three directions.

(5) The welding control method of the portable welding robot according to (3),
in which at least one welding condition is a travel speed,
in a case where
a moving direction of the portable welding robot is set as an X direction,
a groove width direction perpendicular to the X direction is set as a Y direction, and
a groove depth direction perpendicular to the X direction is set as a Z direction,
moving speeds in three directions of the X direction, the Y direction, and the Z direction are calculated according to values of the travel speed that are acquired for the three directions at the groove shape detection positions,
in which a welding distance or a moving time between the groove shape detection positions is divided into two or more sections, and a travel speed of each division point is calculated according to moving speeds in the three directions at each division point, and
in which a travel speed between the groove shape detection positions is controlled such that a travel speed of each division point is constant and a travel speed between the groove shape detection positions changes in a stepwise manner.

(6) The welding control method of the portable welding robot according to (2),
in which at least one of the groove shape detection positions is provided in a boundary region between a linear portion and a curved portion of the guide rail or in a boundary region where a curvature of the guide rail changes in the curved portion.

(7) The welding control method of the portable welding robot according to (6),
in which a section for controlling the welding condition is provided immediately before or immediately after the groove shape detection position provided in the boundary region.

(8) The welding control method of the portable welding robot according to any one of (1) to (7),
in which at least one of a weaving condition, a travel speed, and a welding current is selected as the welding condition, and
in which at least one of the weaving condition, the travel speed, and the welding current is controlled based on the groove shape information between the groove shape detection positions, so that a weld metal in the groove has a constant height along a welding direction.

(9) The welding control method of the portable welding robot according to any one of (1) to (8),
in which the sensing step includes sensing at least one of a workpiece surface on a side on which the groove is provided in the workpiece and a workpiece end portion in a welding direction of the workpiece, in addition to sensing of the groove shape at the groove shape detection position.

(10) The welding control method of the portable welding robot according to any one of (1) to (9),
in which the sensing is touch sensing,
in which at the groove shape detection position, at least five detection points arranged along a cross section of the groove are provided on a root gap and groove side surfaces on both sides of the groove, and
in which the groove shape information is calculated based on the detection data obtained from the detection point.

(11) The welding control method of the portable welding robot according to (2),
in which the weld line is a groove end of any one of both groove side surfaces of the groove shape.

Further, the object of the present invention is achieved by the following configuration (12) relating to a welding control device for a portable welding robot.

(12) A welding control device configured to weld a workpiece having a groove using a portable welding robot that moves along a guide rail, the welding control device including:
a groove shape information calculation unit that calculates groove shape information based on detection data obtained in a sensing step of
setting two or more groove shape detection positions in a welding section from a welding start point to a welding end point, and
sensing groove shapes at the groove shape detection positions via a detection unit provided in the portable welding robot moving on the guide rail; and
a welding condition acquisition unit that acquires a welding condition based on the groove shape information.

Further, the object of the present invention is achieved by the following configuration (13) relating to a portable welding robot.

(13) A portable welding robot that welds a workpiece having a groove while moving on a guide rail and is controlled by the welding control device according to (12), the portable welding robot including:
a detection unit that, in a state of being set on the guide rail, sets two or more groove shape detection positions in a welding section from a welding start point to a welding end point, and senses groove shapes at the groove shape detection positions.

Further, the object of the present invention is achieved by the following configuration (14) relating to a welding system for a portable welding robot.

(14) A welding system of a portable welding robot, the welding system including:
a portable welding robot that welds a workpiece having a groove while moving on a guide rail; and
a welding control device that is capable of controlling an operation of the portable welding robot,
in which the portable welding robot includes a detection unit that sets two or more groove shape detection positions in a welding section from a welding start point to a welding end point, and that senses groove shapes at the groove shape detection positions, and
in which the welding control device includes
a groove shape information calculation unit that calculates groove shape information based on detection data obtained by the sensing, and
a welding condition acquisition unit that acquires a welding condition based on the groove shape information.

ADVANTAGEOUS EFFECTS OF INVENTION

According to the welding control method of a portable welding robot, the welding control device, the portable welding robot, and the welding system for a portable welding robot of the present invention, the groove shape information is acquired based on the detection data obtained at the groove shape detection position in a state where the guide rail and the portable welding robot are installed along the groove, and the welding condition is set based on the groove shape information. Therefore, a change in the groove shape for each groove shape detection position and a change in a positional relationship between the guide rail and the groove that occurs due to a guide rail installation error are considered due to being included in the detection data, and the welding condition can be acquired based on an accurate numerical value.

Accordingly, welding can be performed under welding control that is not affected by guide rail installation accuracy or the change in the groove shape. As a result, highly accurate welding can be performed. With respect to welding work, workpiece assembling work at the time of forming the groove shape is facilitated, position adjustment of the guide rail and the portable welding robot is facilitated, and welding with good work efficiency can be performed.

BRIEF DESCRIPTION OF DRAWINGS

FIG. 4B is a perspective view of the portable welding robot in which a linear guide rail is applied to a meandering groove.
FIG. 7C is a graph illustrating a change in travel speed in the welding control method of the present invention, in a case where control is performed such that the travel speed changes in a stepwise manner.
FIG. 8A is an illustrative diagram of a travel speed and a welding distance when a welding wire tip of a welding torch of a portable welding robot on a linear guide rail moves between weld line position detection points.
FIG. 8D shows cross-sectional shapes of welds when the present embodiment is applied, and is a diagram for illustrating effects of the present embodiment.
FIG. 10 is viewed from directly above.

DESCRIPTION OF EMBODIMENTS

Hereinafter, a welding system according to an embodiment of the present invention will be described with reference to the drawings. Note that the present embodiment is an example of a case where a portable welding robot is used, and the welding system of the present invention is not limited to a configuration of the present embodiment.

<Configuration of Welding System>

Figure 1:
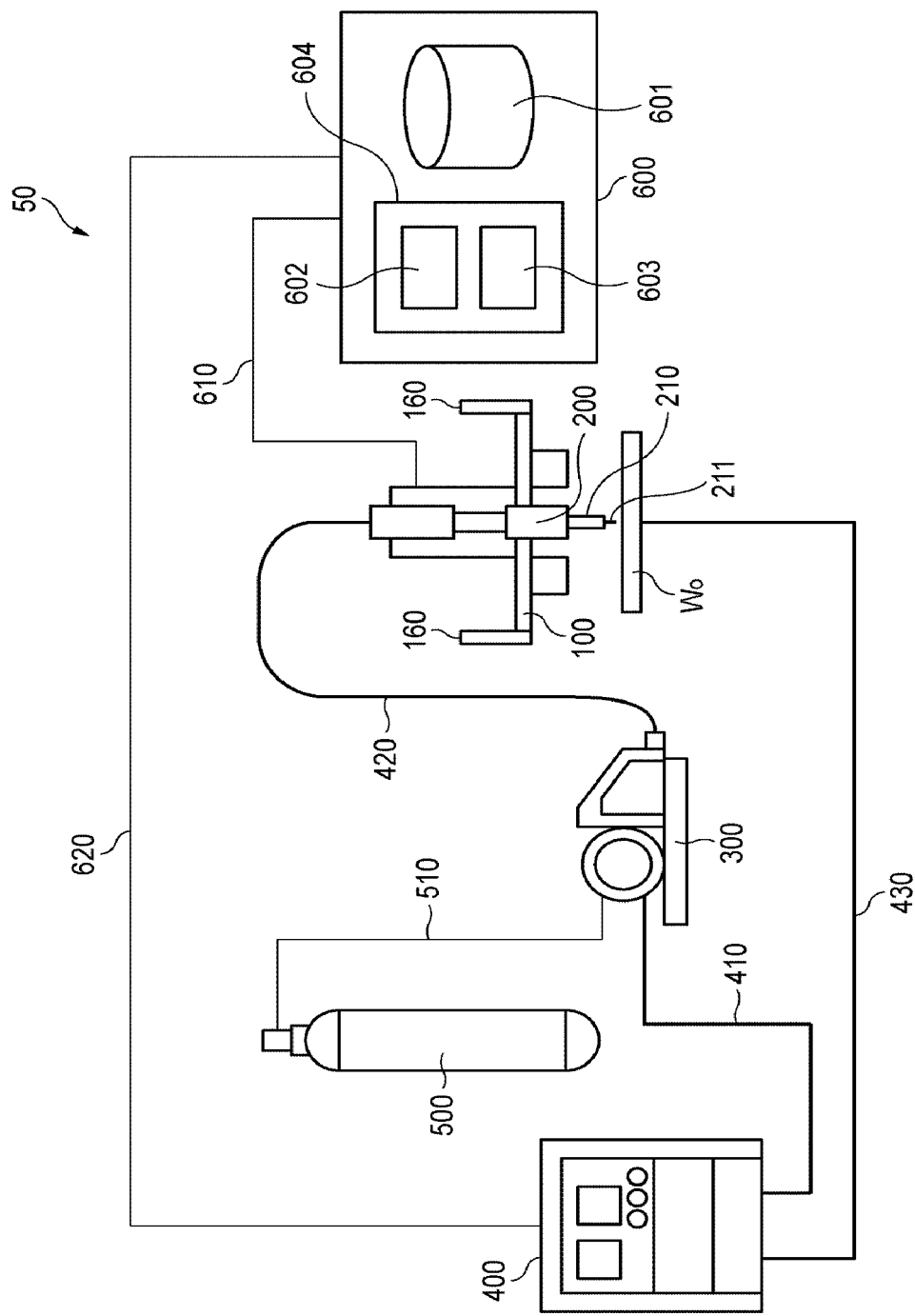
FIG. 1 is a schematic diagram of an embodiment of a welding system of the present invention.

FIG. 1 is a schematic diagram illustrating a configuration of a welding system according to the present embodiment. As shown in FIG. 1, a welding system 50 includes a portable welding robot 100, a feeding device 300, a welding power supply 400, a shielding gas supply source 500, and a control device 600.

[Control Device]

The control device 600 is connected to the portable welding robot 100 by a robot control cable 610, and is connected to the welding power supply 400 with a power supply control cable 620.

The control device 600 includes a data holding unit 601 that holds teaching data determining an operation pattern, a welding start position, a welding end position, a welding condition, a weaving operation, and the like of the portable welding robot 100 in advance, sends a command to the portable welding robot 100 and the welding power supply 400 based on the teaching data, and controls an operation and a welding condition of the portable welding robot 100.

In addition, the control device 600 includes a groove shape information calculation unit 602 that calculates groove shape information based on detection data obtained by sensing to be described later, and a welding condition acquisition unit 603 that corrects and acquires welding conditions of the teaching data based on the groove shape information. The groove shape information calculation unit 602 and the welding condition acquisition unit 603 constitute a control unit 604.

Further, the control device 600 is integrally formed with a controller for teaching and a controller having other control functions. However, the control device 600 is not limited thereto. The control device 600 may be divided into a plurality of parts according to roles, for example, may be divided into two controllers with one for performing teaching and the other having other control functions, or the portable welding robot 100 may include the control device 600. In addition, although a signal is transmitted using the robot control cable 610 and the power supply control cable 620 in the present embodiment, the present invention is not limited thereto, and the signal may be transmitted in a wireless manner. From the viewpoint of usability at a welding site, it is preferable that the control device 600 is divided into two controllers, with one for performing teaching and the other having other control functions.

[Welding Power Supply]

Figure 2:
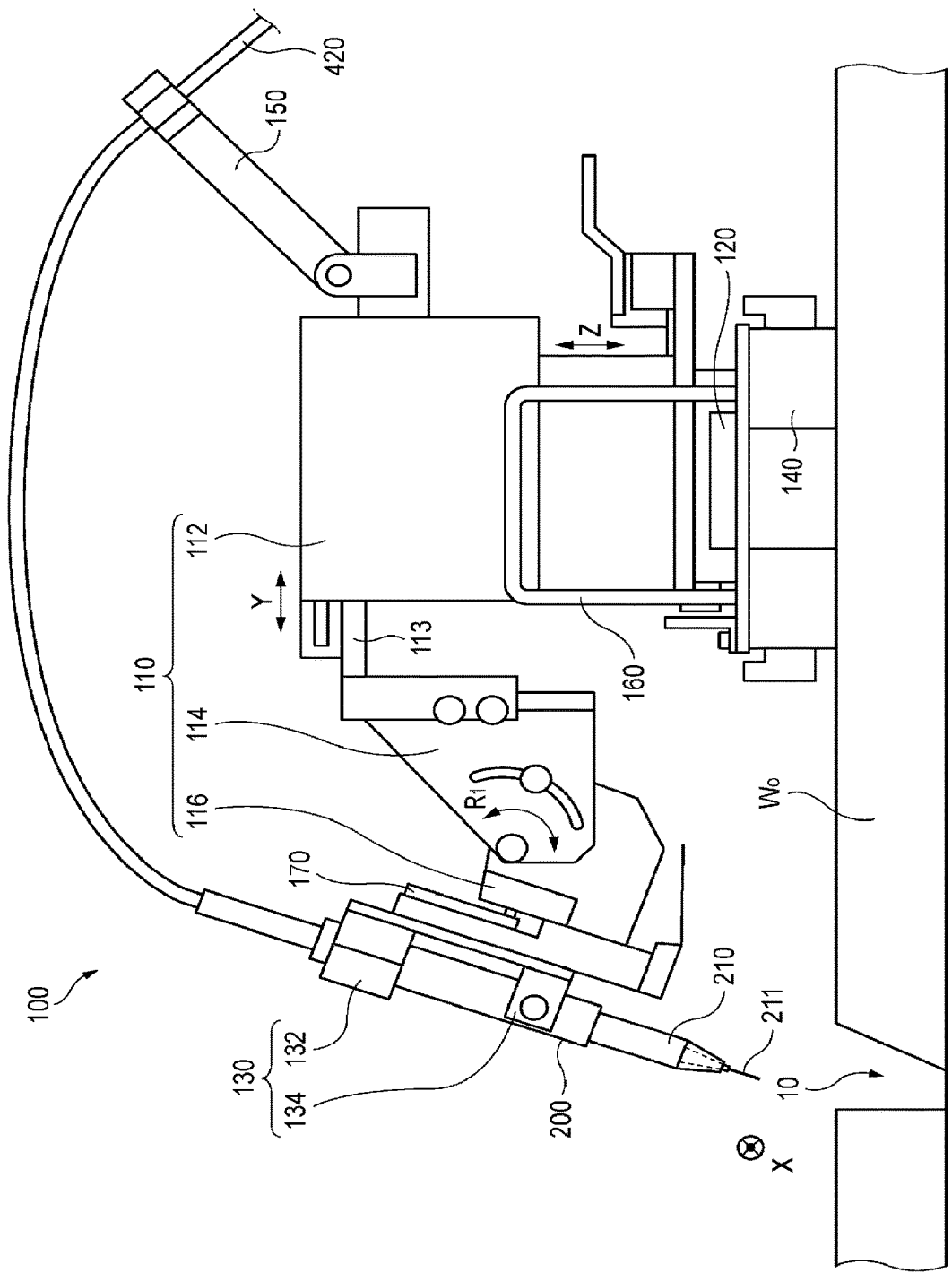
FIG. 2 is a schematic side view of a portable welding robot shown in FIG. 1.

The welding power supply 400 supplies power to a consumable electrode (hereinafter, also referred to as "welding wire") 211 and a workpiece $W_o$ in response to a command from the control device 600, thereby generating an arc between the welding wire 211 and the workpiece $W_o$. The power from the welding power supply 400 is sent to the feeding device 300 via a power cable 410, and is sent from the feeding device 300 to a welding torch 200 via a conduit tube 420. Then, as shown in FIG. 2, power is supplied to the welding wire 211 via a contact tip at a tip of the welding torch 200. Note that a current during welding work may be a direct current or an alternating current, and a waveform thereof is not particularly limited. Therefore, the current may be a pulse of a rectangular wave, a triangular wave or the like.

In the welding power supply 400, for example, the power cable 410 is connected to the welding torch 200 side as a positive (+) electrode, and a power cable 430 is connected to the workpiece $W_o$ as a negative (-) electrode. Note that this is a case of performing welding with reversed polarities, and in a case of performing welding with normal polarities, the welding power supply 400 may be connected to the workpiece $W_o$ side via a positive (+) power cable 430, and may be connected to the welding torch 200 side via a negative (-) power cable 410.

[Shielding Gas Supply Source]

The shielding gas supply source 500 includes a container in which a shielding gas is filled and an additional member such as a valve. The shielding gas is sent from the shielding gas supply source 500 to the feeding device 300 via a gas tube 510. The shielding gas sent to the feeding device 300 is sent to the welding torch 200 via the conduit tube 420. The shielding gas sent to the welding torch 200 flows in the welding torch 200, is guided by a nozzle 210, and is ejected from the tip side of the welding torch 200. As the shielding gas used in the present embodiment, for example, argon (Ar), carbon dioxide ($CO_2$), or a mixed gas thereof can be used.

[Feeding Device]

The feeding device 300 feeds out the welding wire 211 and sends the welding wire 211 to the welding torch 200. The welding wire 211 fed by the feeding device 300 is not particularly limited, and is selected depending on properties, welding forms, and the like of the workpiece $W_o$. For example, a solid wire or a flux-cored wire (hereinafter also referred to as "FCW") is used. In addition, a material of the welding wire is not limited, for example, mild steel may be used, or materials such as stainless steel, aluminum, and titanium may be used. Further, a wire diameter of the welding wire is not particularly limited.

In the present embodiment, it is preferable to apply the FCW from the viewpoint of weldability, and it is more preferable that the FCW is a basic FCW. Further, in a case of applying a basic FCW, one with positive polarity is preferable. In the present embodiment, an upper limit of a preferable wire diameter is 1.6 mm, and a lower limit of a preferable wire diameter is 0.9 mm.

With respect to the conduit tube 420 according to the present embodiment, a conductive path for functioning as a power cable is formed on an outer skin side of the tube, and a protective tube for protecting the welding wire 211 is provided inside the tube and a flow path of the shielding gas is formed. However, the conduit tube 420 is not limited thereto. For example, a tube can be used in which a power supply cable and a shielding gas supply hose are bound around a protective tube for feeding the welding wire 211 to the welding torch 200. In addition, for example, tubes for feeding the welding wire 211 and the shielding gas may be provided separately from a power cable.

[Portable Welding Robot]

Figure 3:
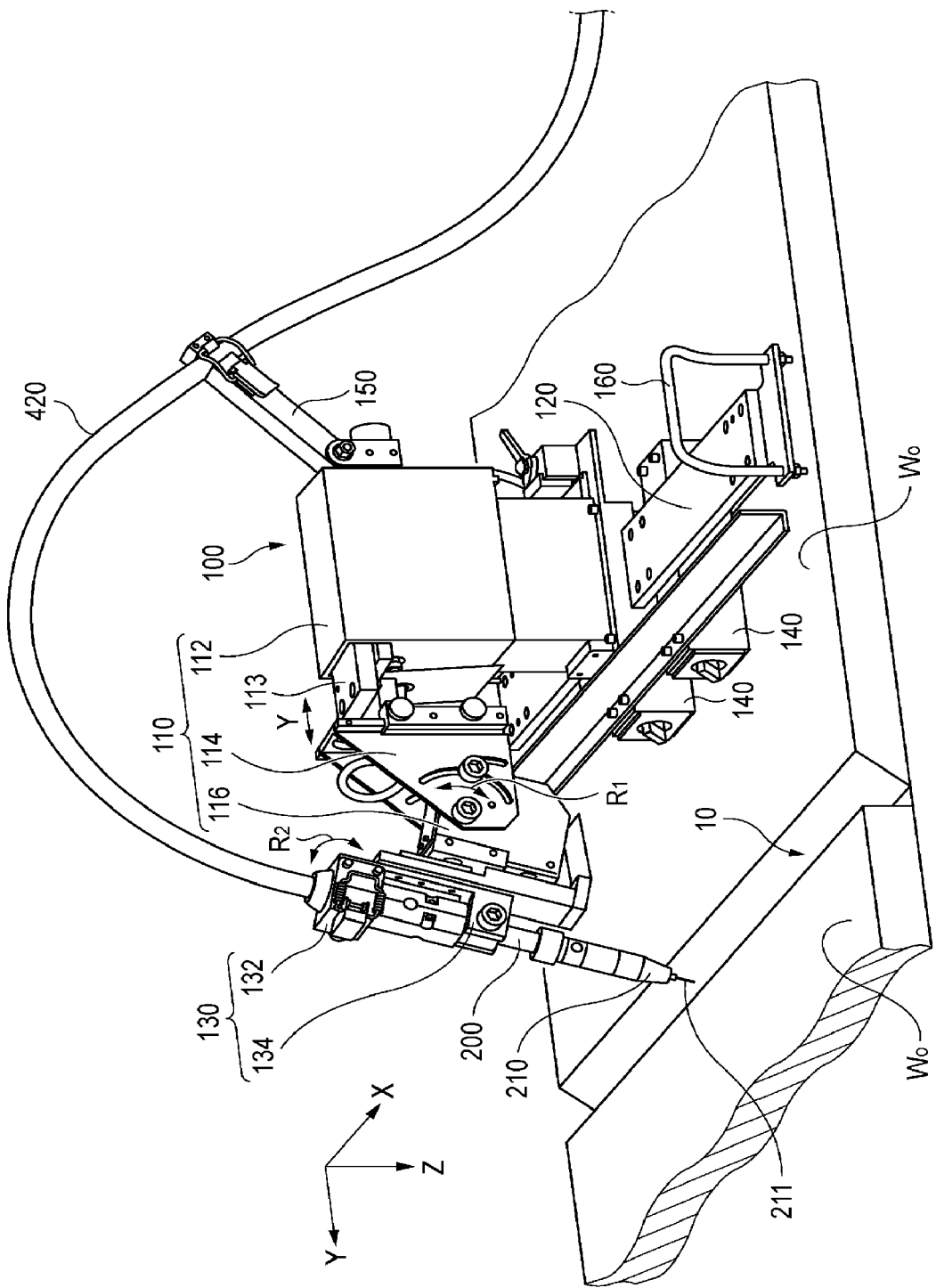
FIG. 3 is a perspective view of the portable welding robot shown in FIG. 2.

As shown in FIGS. 2 and 3, the portable welding robot 100 includes a guide rail 120, a robot main body 110 that is installed on the guide rail 120 and moves along the guide rail 120, and a torch connecting portion 130 that is mounted on the robot main body 110. The robot main body 110 mainly includes a main body portion 112 installed on the guide rail 120, a fixed arm portion 114 attached to the main body portion 112, and a movable arm portion 116 attached to the fixed arm portion 114 in a rotatable state (rotatable in a direction indicated by an arrow $R_1$).

The torch connecting portion 130 is attached to the movable arm portion 116 via a crank 170. The torch connecting portion 130 includes a torch clamp 132 and a torch clamp 134 that fix the welding torch 200. In addition, on a side opposite to a side where the welding torch 200 is attached, the main body portion 112 is provided with a cable clamp 150 that supports the conduit tube 420 that connects the feeding device 300 and the welding torch 200.

In the present embodiment, a touch sensor is used as a detection unit that senses a surface or the like of a groove 10 by applying a voltage between the workpiece $W_o$ and the welding wire 211, and using a voltage drop phenomenon which occurs when the welding wire 211 comes into contact with the workpiece $W_o$. The detection unit is not limited to the touch sensor of the present embodiment, and an image sensor, a laser sensor, or the like, or a combination thereof may be used. The touch sensor of the present embodiment is preferably used in view of simplicity of device configuration.

As indicated by an arrow X in FIG. 2, the main body portion 112 of the robot main body 110 can be driven in a direction perpendicular to a paper surface, that is, in an X direction in which the robot main body 110 moves along the guide rail 120. The main body portion 112 can also be driven in a Z direction that is a depth direction of the groove 10 that is perpendicular to the X direction. In addition, the fixed arm portion 114 can be driven with respect to the main body portion 112 in a Y direction, which is a width direction of the groove 10 that is perpendicular to the X direction, via a slide support portion 113.

Further, the torch connecting portion 130 to which the welding torch 200 is attached can be driven to swing back and forth in the X direction by rotating the crank 170 as indicated by an arrow $R_2$ in FIG. 3. Further, the movable arm portion 116 is attached to the fixed arm portion 114 so as to be rotatable as indicated by the arrow $R_1$, and can be adjusted to an optimum angle and fixed.

As described above, the robot main body 110 can drive the welding torch 200, which is a tip portion of the robot main body 110, at three degrees of freedom. However, the robot main body 110 is not limited thereto, and may be driven at any number of degrees of freedom depending on application.

With the above configuration, a tip portion of the welding torch 200 attached to the torch connecting portion 130 can be directed in an arbitrary direction. Further, the robot main body 110 can be driven on the guide rail 120 in the X direction in FIG. 2. The welding torch 200 reciprocates in the Y direction as the robot main body 110 moves in the X direction, so that the welding torch 200 can perform weaving welding. In addition, the welding torch 200 can be tilted according to a construction state such as providing a push angle or a drag angle, for example, by driving of the crank 170.

An attachment member 140 such as a magnet is provided below the guide rail 120, and the guide rail 120 is configured to be easily attached to and detached from the workpiece $W_o$ by the attachment member 140. When setting the portable welding robot 100 on the workpiece $W_o$, an operator can easily set the portable welding robot 100 on the workpiece $W_o$ by grasping both side handles 160 of the portable welding robot 100.

<Welding Condition Control Method>

Next, a welding condition control method using the welding system 50 according to the present embodiment will be described in detail.

[Control of Travel Speed between Weld Line Position Detection Points $T_d$]

Figure 4A:
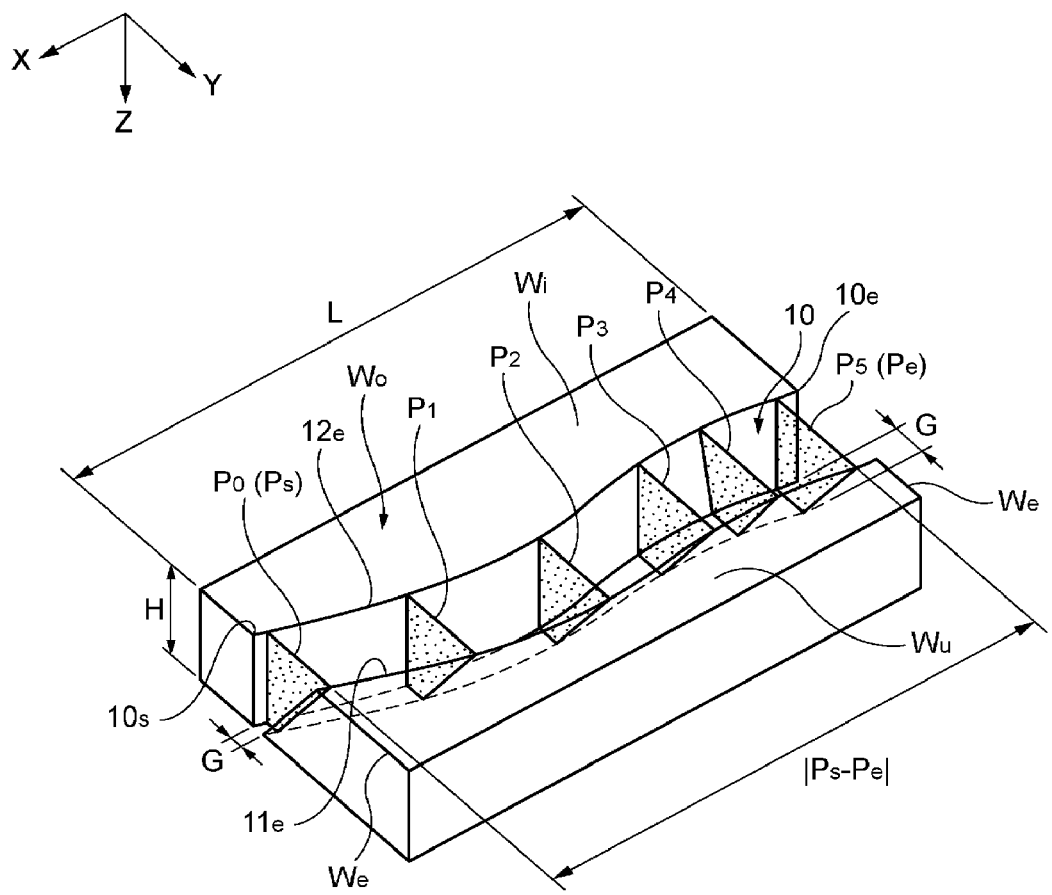
FIG. 4A is a schematic perspective view for illustrating a groove shape detection position by the portable welding robot shown in FIG. 3.
Figure 4C:
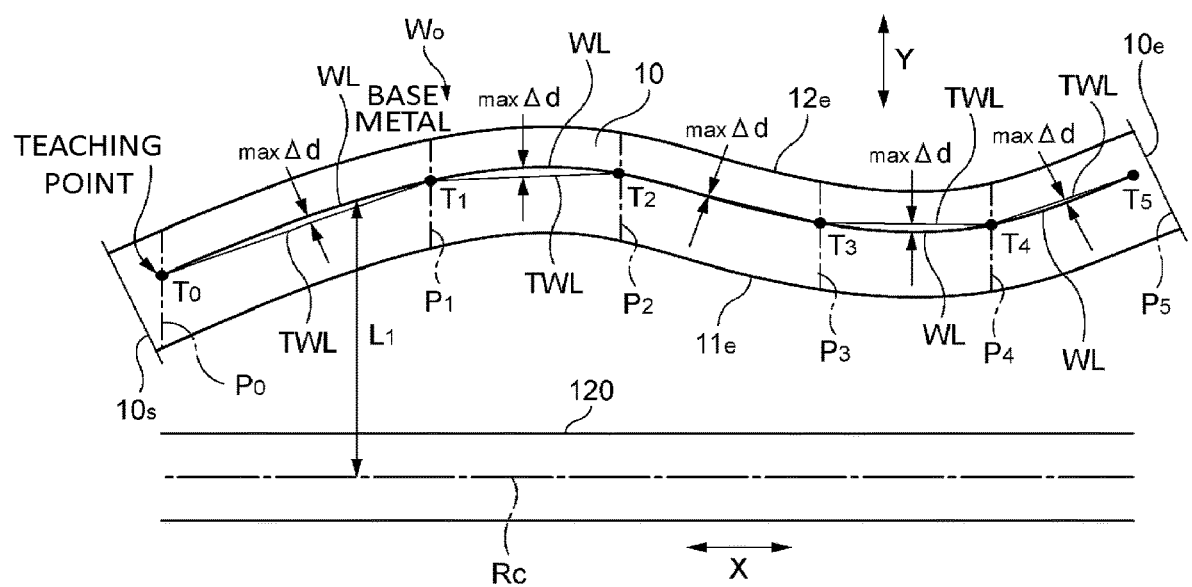
FIG. 4C is an illustrative diagram for illustrating a concept of a positional relationship between the linear guide rail and the groove in FIG. 4B.

FIG. 4A is perspective view of a groove part of the workpiece $W_o$, and is a schematic perspective view in which the groove 10 meanders in the welding direction X, which is a longitudinal direction of the groove 10, and further, the groove 10 whose root gap G is changed in a width direction Y of the groove 10 is welded. FIG. 4B is a schematic perspective view of the portable welding robot 100 in which the linear guide rail 120 is applied to the meandering groove 10 as shown in FIG. 4A. FIG. 4C is a conceptual diagram illustrating a groove shape detection position $P_n$, and a positional relationship between the groove 10 and the guide rail 120 on a plane.

For welding the groove 10, welding conditions at the time of welding are acquired before start of welding by using the robot main body 110 that moves along the guide rail 120. Specifically, for example, based on an operation signal of the control device 600, the robot main body 110 is driven to start automatic sensing of a groove shape, groove shape information is calculated to further calculate the welding conditions, and automatic gas-shielded arc welding is implemented.

Sensing the above-described touch sensor performs a sensing step for the groove shape, a plate thickness, a start/end part, and the like as follows.

For example, a case is considered where, in a welding section from a welding start point $10_s$ to a welding end point $10_e$ of the groove 10 as shown in FIG. 4A, the groove meanders, the root gap G also changes, and the groove shape is different for each place. In such a case, in the sensing step, a plurality of locations (six locations in the present embodiment) where a cross-sectional shape of the groove 10 is an inverted trapezoidal cross-sectional shape is provided as the groove shape detection position $P_n$ ($P_0$, $P_2$, . . . , $P_5$). More specifically, the groove shape detection position $P_n$ closest to the welding start point $10_s$ is set as a first groove shape detection position $P_s$ ($P_0$), the groove shape detection position $P_n$ closest to the welding end point $10_e$ is set as a second groove shape detection position $P_e$ ($P_5$), and the touch sensor performs sensing while the robot main body 110 moves on the guide rail 120.

Next, a method of setting the first groove shape detection position $P_s$ and the second groove shape detection position $P_e$ will be described in more details.

The first groove shape detection position $P_s$ closest to the welding start point $10_s$ side and the second groove shape detection position $P_e$ closest to the welding end point $10_e$ side are set such that $|P_s-P_e|$ which is a difference between the first groove shape detection position $P_s$ and the second groove shape detection position $P_e$ satisfies the following expression with respect to a distance L between workpiece end portions $W_e$.

$$0.5 \leq |P_s - P_e|/L \leq 1$$

In this way, accuracy of detection data is improved by defining set positions of the first groove shape detection position $P_s$ and the second groove shape detection position $P_e$. The value of "$|P_s-P_e|/L$" is preferably 0.6 or more, more preferably 0.7 or more, and still more preferably 0.8 or more.

The first groove shape detection position $P_s$ is preferably set in the vicinity of the welding start point, and the second groove shape detection position $P_e$ is preferably set in the vicinity of the welding end point.

Position setting of the first groove shape detection position $P_s$ and the second groove shape detection position $P_e$ may be input to the control device 600 in advance by teaching or the like. Alternatively, the position setting may be automatically performed by sensing. In addition, the distance L between the workpiece end portions $W_c$ may be calculated by sensing, and the first groove shape detection position $P_s$ and the second groove shape detection position $P_e$ may be automatically set within a range satisfying the above expression.

Figure 5:
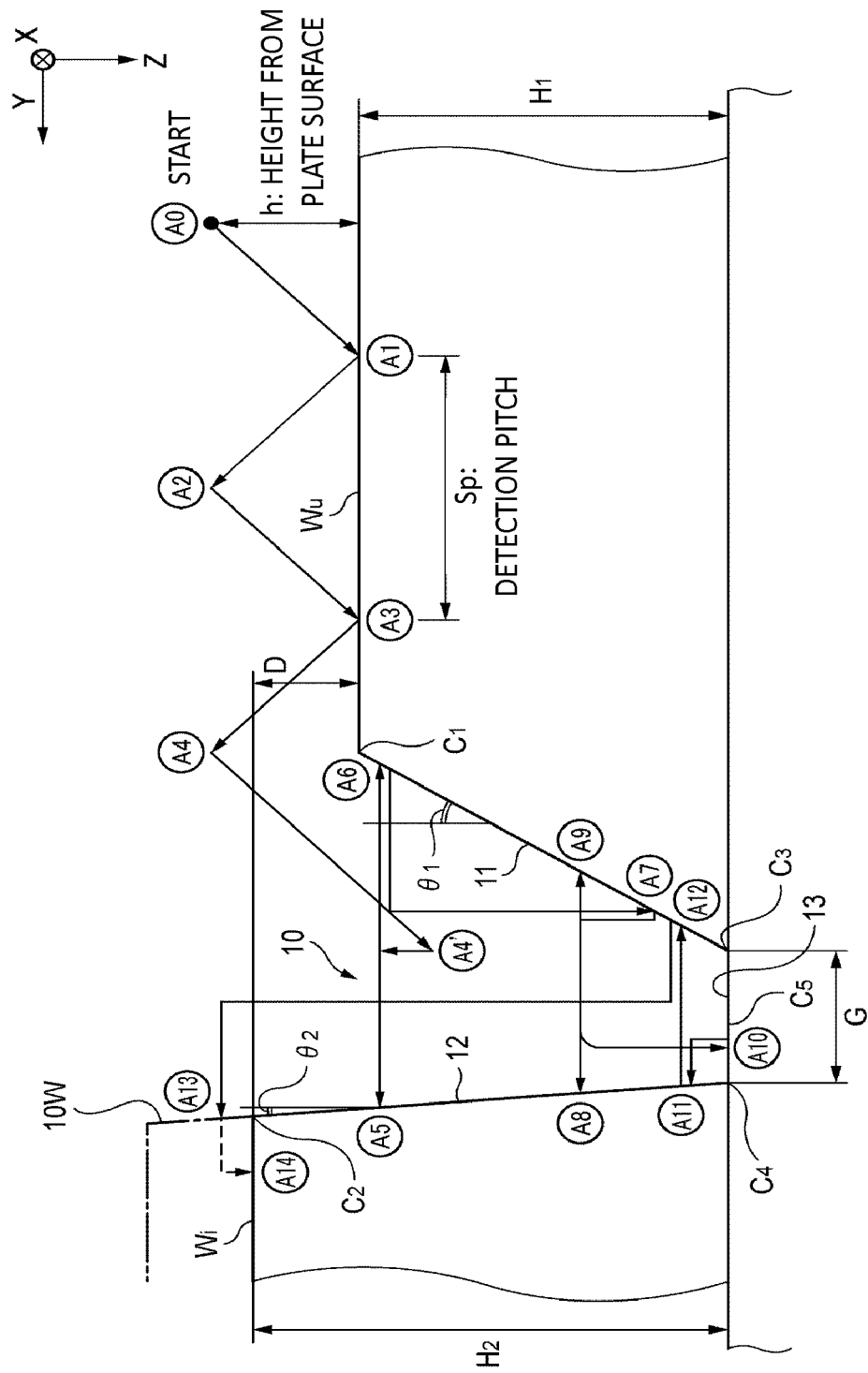
FIG. 5 is a schematic side view for illustrating sensing with the portable welding robot shown in FIG. 3.

After the sensing step, based on detection data of a groove cross-sectional shape at each of the groove shape detection positions $P_n$ ($P_0$ to $P_5$) obtained in the sensing step, groove shape information is calculated. That is, groove angles $\theta_1$, $\theta_2$ of the groove shape, plate thicknesses $H_1$, $H_2$, and the root gap G as shown in FIG. 5, the distance L between workpiece end portions $W_c$ (groove shape information calculation step) and the like are calculated. Then, based on the detection data of the groove shape at each of the groove shape detection positions $P_n$ ($P_0$ to $P_5$), welding conditions are corrected for each of the groove shape detection positions $P_n$ ($P_0$ to $P_5$) from welding conditions generated or set in advance in the control device 600 (welding condition acquisition step), and welding conditions for actually performing welding are acquired. Then, using the welding conditions, the robot main body 110 is driven to start welding.

Intervals between the groove shape detection positions $P_n$ is set so as to satisfy the following conditions. For example, as shown in FIG. 4B, a case will be described where the groove 10 shown in FIG. 4A meanders, the root gap G changes, and a weld having different groove shapes for each place is welded using the linear guide rail 120. Details of the conditions for determining the intervals between the groove shape detection positions $P_n$ in this case will be described with reference to FIG. 4C. First, a weld line WL is determined in advance at an arbitrary position of the groove 10 on the workpiece $W_o$. For example, a relative distance $L_1$ between the curved weld line WL and the guide rail 120 (specifically, a rail center $R_c$) changes. Intersections of the groove shape detection positions $P_n$ and the weld line WL are set as weld line position detection points $T_n$. ($T_0$ to $T_5$). The weld line position detection points $T_n$ are important points for obtaining detection data in the groove shape detection positions $P_n$. Further, a welding trajectory when welding is actually performed between weld line position detection points $T_n$ adjacent to each other is set as a welding trajectory line TWL, and the robot main body 110 is driven such that the tip of the welding wire 211 follows the welding trajectory line TWL. In the linear guide rail 120, the welding trajectory line TWL is a straight line.

At this time, a relative distance $\Delta d$ between the weld line WL and the welding trajectory line TWL is generated. It is preferable to set the intervals such that a maximum value max$\Delta d$ of the relative distance among relative distances $\Delta d$ is reduced as much as possible. Here, in order to reduce the maximum value max$\Delta d$ of the relative distance, it is conceivable to increase the number of the groove shape detection positions $P_n$, but sensing efficiency decreases with an increase of the number of the groove shape detection position $P_n$. In the present embodiment, when setting the weld line position detection point $T_n$ on the weld line WL, for example, it is preferable to narrow an interval between the groove shape detection positions $P_n$ in a portion where the weld line WL is largely curved in order to reduce an error from the weld line WL, and to widen the interval in a linear portion where the weld line WL is not relatively curved. The relative distance $\Delta d$ is given in consideration of a relative distance in a three-dimensional space.

Figure 4D:
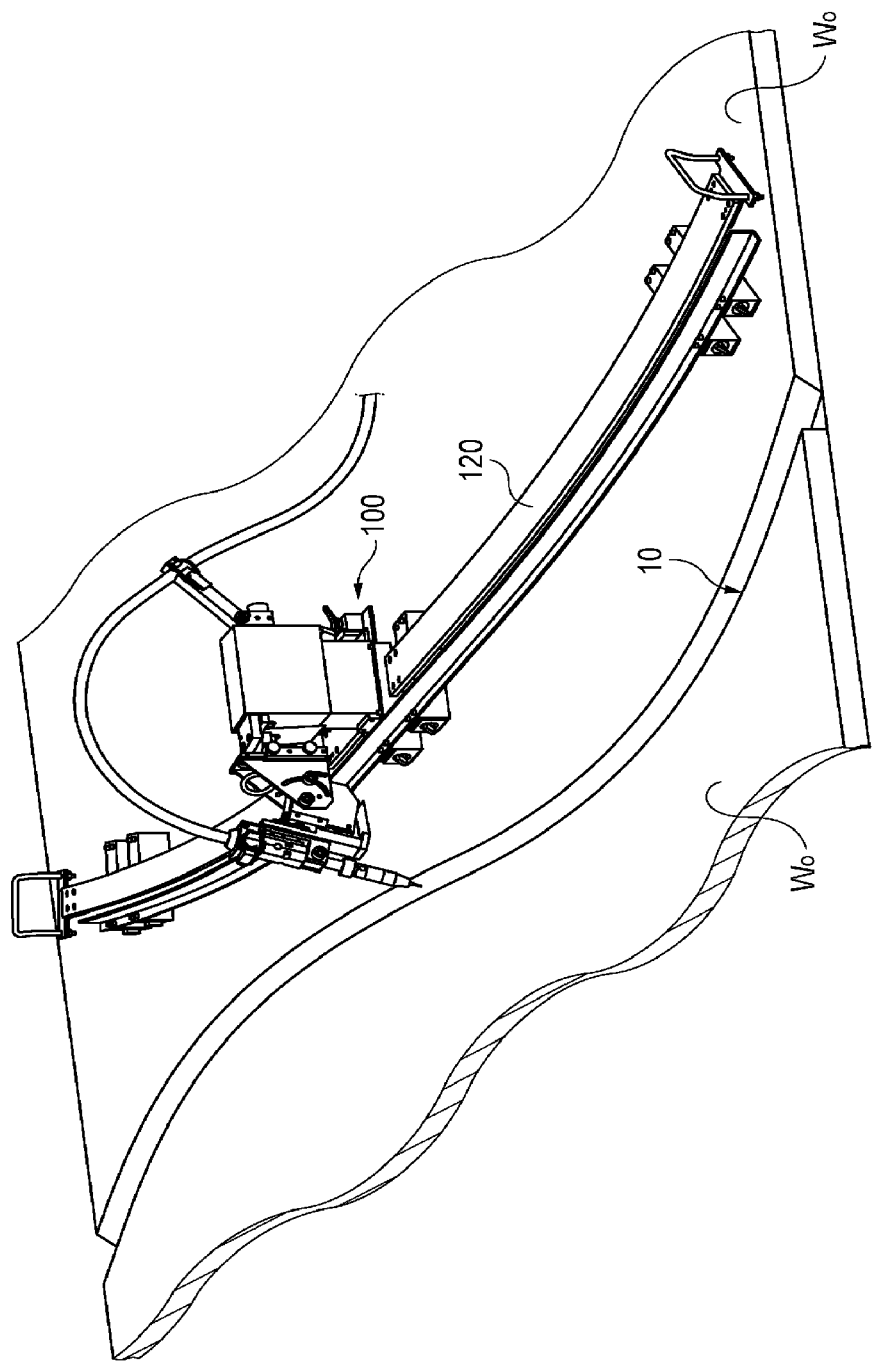
FIG. 4D is a perspective view of the portable welding robot to which a curved guide rail is applied to a meandering groove.
Figure 4E:
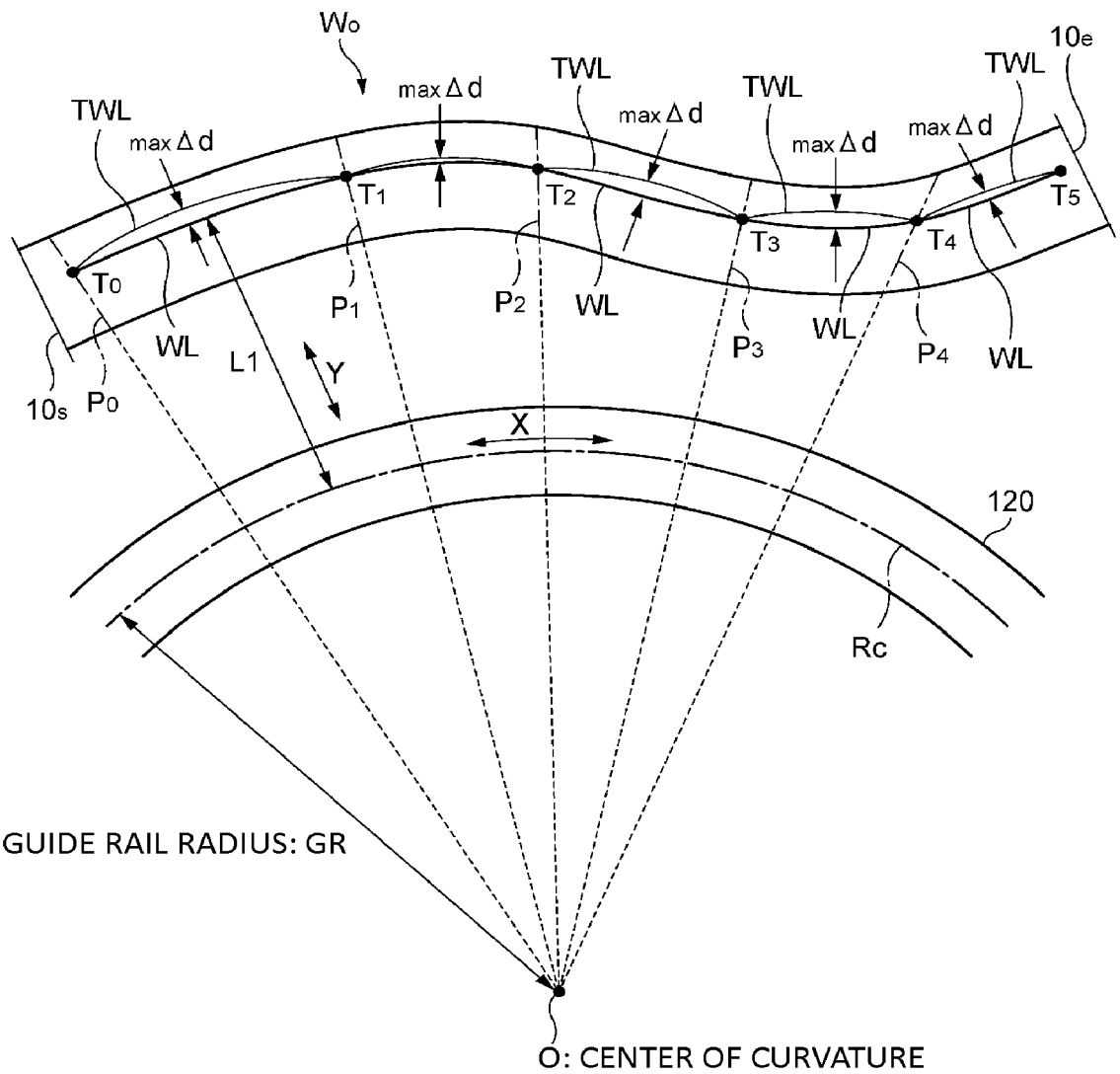
FIG. 4E is an illustrative diagram for illustrating a concept of a positional relationship between the curved guide rail and the groove in FIG. 4D.

Next, FIGS. 4D and 4E illustrate a case where the groove 10 shown in FIG. 4A meanders, the root gap G changes, and a weld having different groove shapes for each place is welded using a curved guide rail 120. In this case, the robot main body 110 travels around a curvature center O of the guide rail 120, and the welding trajectory line TWL at this time becomes a curved line due to a curvature of the guide rail 120.

In this case, intervals between the groove shape detection positions $P_n$ to which the curved guide rail 120 as shown in FIG. 4D is applied is set as shown in FIG. 4E similarly to the case where the linear guide rail 120 is applied. Although the welding trajectory line TWL is a curved line due to the curvature of the guide rail 120, it is preferable to set the interval such that the maximum value max$\Delta d$ of the relative distance is reduced as much as possible as in the case of the linear guide rail 120 shown in FIG. 4C.

In the present embodiment, it is preferable to set the groove shape detection position $P_n$ such that the maximum value max$\Delta d$ of the relative distance is equal to or less than two times of a welding wire diameter, and it is more preferable to set the groove shape detection position $P_n$ such that the maximum value max$\Delta d$ of the relative distance is less than the welding wire diameter. Specifically, when the welding wire diameter is 1.2 mm, it is preferable to provide the groove shape detection position $P_n$ such that the maximum value max$\Delta d$ of the relative distance is 2 mm or less. Setting the maximum value max$\Delta d$ of the relative distance to be equal to or less than two times of the welding wire diameter indicates that a tolerance that can ensure good welding quality with respect to the weld line WL to be welded originally means an error within two times the welding wire diameter.

In addition, from the viewpoint of clarity, the weld line WL is preferably groove edges $11_e$, $12_e$ (intersections of workpiece upper surfaces $W_u$, $W_1$ and groove side surfaces 11, 12), which are upper end corner portions of the cross-sectional shape of the groove 10 on the workpiece $W_o$, or any one of both ends of a root portion 13, as shown in FIGS. 4A, 4B and 5. Further, it is more preferable to set the groove edges $11_e$, $12_e$ as the weld line, which improves the clarity since it is possible to accurately grasp the change in the groove shape that occurs due to unevenness, welding deformation, a dimension defect, or the like.

In FIG. 4C, the weld line WL is set so as to pass through the inside (center) of the groove 10.

In the present embodiment, a sensing method of the touch sensor for obtaining data of the groove shape is not particularly limited, and can be as follows.

A sensing method for the groove 10 using the touch sensor will be described with reference to FIG. 5.

For example, the touch sensor performs sensing at the detection points while moving in directions indicated by arrows in the drawing in an order of: point A0, point A1, point A2, . . . , point A14. In this sensing, the following items are detected.

[1] Starting from point A0, a position of a workpiece surface $W_u$ on one end side of the groove 10 is detected by detection at point A1 and point A3.

[2] At point A4', when the touch sensor is lower by a set distance than the position of the workpiece surface $W_u$ detected at point A1 and point A3, it is determined to be in the groove, and the touch sensor is returned to a height in the vicinity right under the workpiece surface $W_u$, and is directed to point A5 for detection.

[3] By detection of point A6 and point A9, a provisional inclination angle $\theta_1$ of the groove side surface 11 on the one end side of the groove 10 is detected.

[4] By detection of point A5 and point A8, a provisional inclination angle $\theta_2$ of the groove side surface 12 on the other end side of the groove 10 is detected.

[5] By detection of the provisional inclination angles $\theta_1$, $\theta_2$, a position where the root portion 13 of the groove 10 can be reliably detected is determined, and then point A10 of the root portion 13 is detected. For example, in practice, a position on a lower side by a predetermined dimension from point A8 is set as the root portion 13.

[6] The plate thickness $H_1$ is calculated by the detection of point A1, point A3, and point A10. Point A11 and point A12 close to the root portion 13 of the groove 10 are detected using the plate thickness $H_1$, and a more accurate inclination angle $\theta_1$ of the groove side surface 11 on the one end side is detected by detection of point A12 and point A6. Further, by the detection of point A11 and point A5, a more accurate inclination angle $\theta_2$ of the groove side surface 12 on the other end side is determined.

[7] The root gap G is calculated based on intersections of a line connecting point A6 and point A12 (that is, an inclined surface on the one end side), a line connecting point A5 and point A11 (that is, an inclined surface on the other end side), with a straight line that is parallel to a line connecting point A3 and point A1 and that passes through point A10.

[8] In addition, whether there is a wall constituting the groove side surface 12 on the other end side of the groove 10 is detected at point A13. In the present embodiment, the wall is considered as a groove of a flat joint which does not exist.

[9] If no wall is detected even when the touch sensor exceeds an extension line of the line connecting point A5 and point A11, it is determined that there is no wall. The process proceeds as it is, and the workpiece surface $W_l$ on the other end side is detected at point A14. Next, the plate thickness $H_2$ is calculated by the detection of point A14 and point A10, and a level difference D between both sides of the groove 10 is calculated based on a difference between the plate thickness $H_1$ and the plate thickness $H_2$.

[10] A threshold is provided in advance for the level difference D, and when the level difference D is equal to or greater than the threshold, it is regarded as a groove of a T-joint, not a groove of a flat joint, and welding conditions for the T-joint are selected.

[11] When the level difference D is equal to or less than the threshold, it is regarded as unevenness of the flat joint, and welding conditions for the flat joint are selected.

The procedure of sensing is not limited to the trapezoidal groove 10 shown in the drawing, and further the groove shape can be detected by the same procedure, for example, even in a V-shaped groove. In addition, a detection pitch $S_p$ between the detection points in sensing is not particularly limited, and can be set as appropriate.

In addition, the detection points for obtaining the information on the cross-sectional shape of the groove 10 needs to maintain sufficient accuracy as the groove shape information. For this purpose, it is preferable that the number of detection points is 5 or more. Further, it is possible to obtain the detection data with higher accuracy by selecting the positions of the detection points. For example, as shown in FIG. 5, the 5 detection points may include 4 points at corner portions $C_1$, $C_2$, $C_3$, and $C_4$, which include upper and lower ends of the groove side surfaces 11, 12 on both left and right sides, and 1 point at a portion $C_5$ of the root portion 13. From the viewpoint of sensing efficiency, the number of the detection points for obtaining the groove shape information is preferably 10 or less.

By sensing of such a touch sensor, it is possible to obtain the detection data necessary for calculating the groove shape information of the groove shape detection position $P_n$, and to obtain a relative distance between a position of the robot main body 110 and the groove shape detection position $P_n$ as the detection data.

Figure 6:
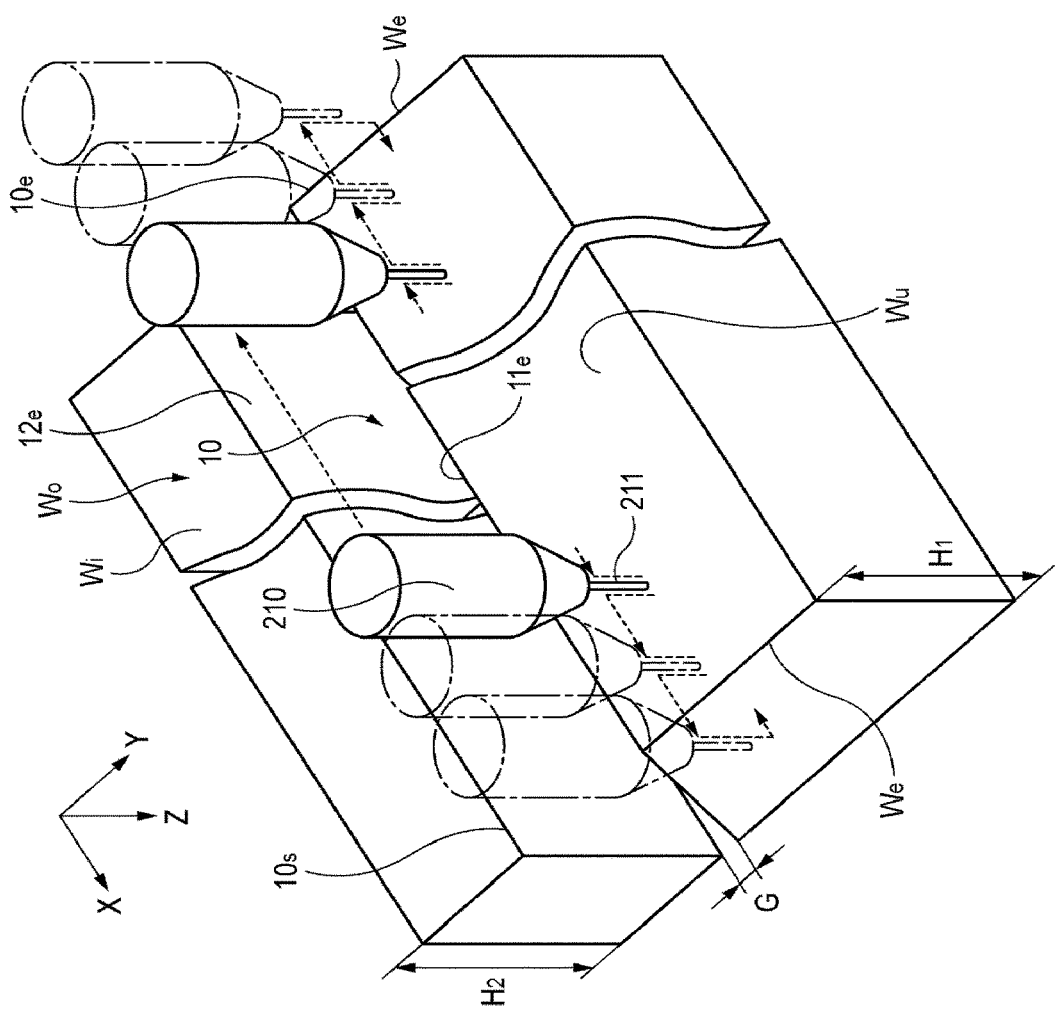
FIG. 6 is a schematic perspective view for illustrating sensing with the portable welding robot shown in FIG. 3.

Note that it is preferable that the sensing step also includes sensing of a shape of a periphery of the groove 10 in addition to the sensing of the groove shape at the groove shape detection position $P_n$ described above. Specifically, as shown in FIG. 6, it is preferable that the tip of the welding wire 211 moves between a position separated by a predetermined distance from the workpiece $W_o$ in the X direction and a position in contact with the workpiece $W_o$ and moves in the Y direction in a plane of the workpiece $W_o$, thereby detecting the workpiece upper surfaces $W_u$, $W_l$ on the side on which the groove 10 is provided in the workpiece $W_o$ and sensing the workpiece end portion $W_e$ in a welding direction of the workpiece $W_o$. By sensing the shape of the periphery of the groove 10, a correlation distance between the positions of the workpiece $W_o$ and the workpiece end portion $W_e$ and the position of the robot main body 110 can be acquired as the detection data.

As described above, the detection data necessary for performing automatic welding to a weld where the groove 10 shown in FIG. 4A meanders, the root gap G changes, the groove shape is different for each place, and further an installation error of the guide rail occurs, with high accuracy by the portable welding robot 100 can be obtained in the sensing step of the present embodiment.

In the control device 600, the groove shape information is calculated based on the detection data obtained in the sensing step, and the welding conditions are acquired based on the groove shape information. The welding conditions to be acquired include a target position of an arc point inside the groove 10 (as will be described later, the target position of the arc point is considered to be the same as the position of the tip of the welding wire 211), the number of deposited weld metals, and the like, in addition to a travel speed, a welding current, and a welding voltage. When using the welding conditions to perform welding control, the welding conditions can be controlled as in the graphs shown in FIGS. 7A to 7C. For example, when a travel speed $W_n$, which is one of the welding conditions, changes between the groove shape detection positions $P_n$, the travel speed $W_n$ is changed in a predetermined shape with the passage of time in between adjacent groove shape detection positions $P_n$ (for example, between $P_1$ and $P_2$), in accordance with a value of the travel speed $W_n$ (welding condition) acquired for each of the groove shape detection positions $P_n$.

Figure 7A:
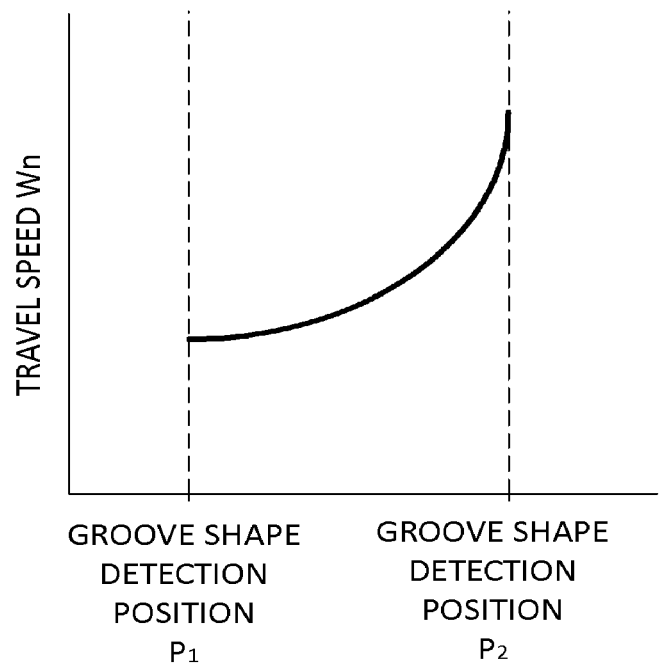
FIG. 7A is a graph illustrating a change in travel speed in a welding control method of the present invention, in a case where control is performed such that the travel speed changes in a curved manner.

In a case illustrated in FIG. 7A, the travel speed $W_n$ during movement from the groove shape detection position $P_1$ to the groove shape detection position $P_2$ is controlled to change in a curved manner. In a case illustrated in FIG. 7B, the travel speed $W_n$ during the movement from the groove shape detection position $P_1$ to the groove shape detection position $P_2$ is controlled to change in a linear manner. In a case illustrated in FIG. 7C, the travel speed $W_n$ during the movement from the groove shape detection position $P_1$ to the groove shape detection position $P_2$ is controlled to change stepwise, that is, in a stepwise manner.

According to the above, when a change in a welding condition occurs between the groove shape detection positions $P_n$, the welding condition is controlled so as to change in at least one of a linear manner, a stepwise manner, and a curved manner between the groove shape detection positions $P_n$ in accordance with the value of the welding condition acquired for each of the groove shape detection positions $P_n$. Therefore, even when a difference of the welding condition is great between the groove shape detection positions $P_n$, the welding condition can be changed gradually, and smooth welding can be performed with avoiding a rapid change in the welding conditions between the groove shape detection positions $P_n$. As a result, highly accurate welding can be performed.

[Method of Obtaining Moving Speed in Each of Three Directions in Case of Linear Guide Rail]

Next, in the control of the travel speed between the weld line position detection points $T_n$ in a case of the linear guide rail 120 shown in FIGS. 4B and 4C, a method of obtaining the travel speed W will be described at first with reference to FIGS. 8A, 8B, and 8C. Thereafter, a method of obtaining a moving speed in each of three directions of the X direction, the Y direction, and the Z direction will be described.

Figure 8B:
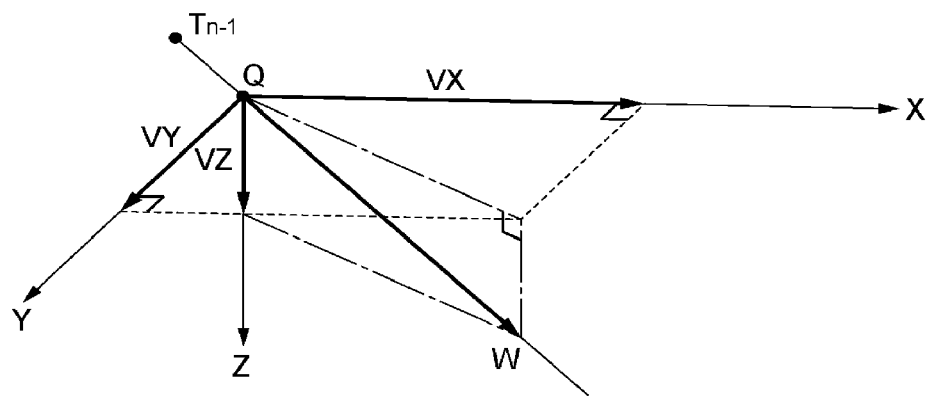
FIG. 8B is an illustrative diagram for illustrating the travel speed obtained by enlarging a VIII portion shown in FIG. 8A.

FIG. 8A is an illustrative diagram of the travel speed W and a welding distance $DW_n$ when the tip of the welding wire 211 of the robot main body 110 on the linear guide rail 120 moves between the weld line position detection points $T_n$. FIG. 8B is an illustrative diagram which is an enlarged view of a VIII portion shown in FIG. 8A for illustrating the travel speed W at an arbitrary point between the weld line position detection points $T_n$ ($T_{n-1}$ to $T_n$). FIG. 8C is an illustrative diagram illustrating a relationship between the welding distance $DW_n$ and moving distances in three directions of the X direction, the Y direction, and the Z direction ($VDX_n$, $VDY_n$, $VDZ_n$).

In FIG. 8A, it is assumed that the tip of the welding wire 211 of the robot main body 110 moves between 3 points of a weld line position detection point $T_n$, a weld line position detection point $T_{n-1}$ one before the weld line position detection point $T_n$, and a weld line position detection point $T_{n-1}$ one after the weld line position detection point $T_n$, with a change in travel speed, that is, a travel speed $W_{n-1}$ at the detection point $T_{n-1}$, a travel speed $W_n$ at the detection point $T_n$, and a travel speed $W_{n-1}$ at the detection point $T_{n+1}$.

The tip of the welding wire 211 of the robot main body 110 is considered to be the same as the arc point of the tip of the welding wire 211 generated in actual welding, and the travel speed, the welding distance, and welding time, which will be described later, are synonymous with the moving speed, the moving distance, and moving time of the tip of the welding wire 211.

First, a basic concept representing a relationship between a speed, an acceleration, and a moving distance can be expressed by the following basic equations (1) to (3).

[Formula 1]

$$v = v_0 + \alpha t \qquad (1)$$

[Formula 2]

$$x = x_0 + v_0 t + \tfrac{1}{2}\alpha t^2 \qquad (2)$$

[Formula 3]

$$v^2 - v_0^2 = 2\alpha s \qquad (3)$$

Where v is a speed, $v_o$ is an initial speed, $\alpha$ is an acceleration, x is a moving distance, $x_o$ is an initial position, s is a displacement distance, and t is time.

Reference signs and symbols shown in FIG. 8A, FIG. 8B, and FIG. 8C will be described below.

$W_{n-1}$: the travel speed at the weld line position detection point $T_{n-1}$, and a calculated value by the welding condition acquisition unit 603

$W_n$: the travel speed at the weld line position detection point $T_n$, and a calculated value by the welding condition acquisition unit 603

$W_{n+1}$: the travel speed at the weld line position detection point $T_{n+1}$, and a calculated value by the welding condition acquisition unit 603

Note that $W_{n-1}$, $W_n$, and $W_{n+1}$ are calculated by the welding condition acquisition unit 603 based on the groove shape information of the respective groove shape detection positions $P_{n-1}$, $P_n$, $P_{n+1}$) so that heights of the weld metal in the welding groove are the same at each of the groove shape detection positions $P_n$.

$VDX_n$, $VDY_n$, $VDZ_n$: the moving distances of the tip of the welding wire 211 of the robot main body 110 in three directions (X direction, Y direction, Z direction) between two points of $T_{n-1}$ and $T_n$, and detection data acquired in the sensing step VX, VY, VZ: moving speeds of the tip of the welding wire 211 of the robot main body 110 in three directions (X direction, Y direction, Z direction) after t seconds since welding start at the weld line position detection point $T_n$.

Note that the $VDX_n$ and the VX are the same as a traveling distance and a traveling speed of the robot main body 110 traveling on the guide rail 120.

$DW_n$: a welding distance between two points, that is, from the weld line position detection point $T_{n-1}$ to $T_n$ $t_n$: welding time between two points, that is, from the weld line position detection point $T_{n-1}$ to $T_n$ a: an acceleration when the travel speed changes between two points, that is, from the weld line position detection point $T_{n-1}$ to $T_n$ W: a travel speed after t seconds since welding start at the weld line position detection point $T_{n-1}$ From the above, a formula for controlling the moving speed of the tip of the welding wire 211 in three directions (X direction, Y direction, Z direction) of the robot main body 110 can be obtained by the following equation after the travel speed is obtained.

Figure 8C:
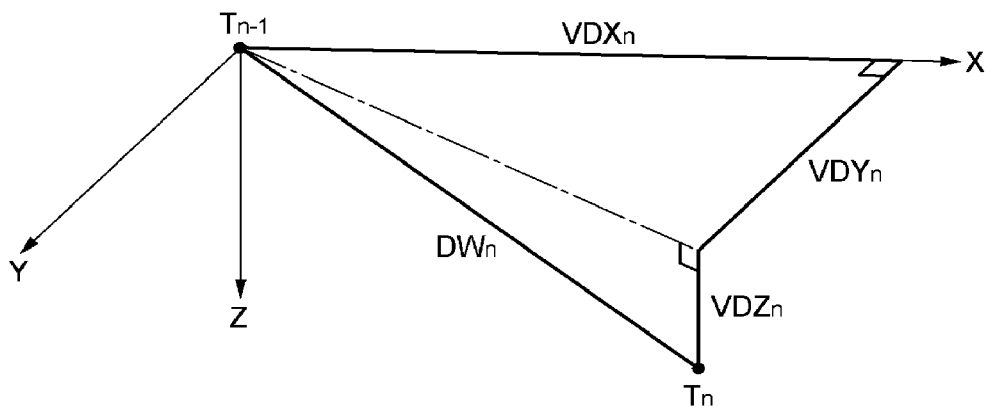
FIG. 8C is an illustrative diagram of a moving distance when the welding wire tip of the welding torch of the portable welding robot on the linear guide rail moves between the weld line position detection points.

From FIG. 8C, the welding distance $DW_n$ between the two points, that is, from $T_{n-1}$ to $T_n$, is expressed by the following equation by combining $VDX_n$, $VDY_n$, and $VDZ_n$.

[Formula 4]

$$DW_n = (VDX_n^2 + VDY_n^2 + VDZ_n^2)^{1/2} \quad (4)$$

Since the welding distance $DW_n$ is obtained from above and the travel speeds $W_{n-1}$ and $W_n$ at $T_{n-1}$ and $T_n$ are also known, the acceleration a of the travel speed changing between the two points is obtained using the following equation, based on the above basic equation (3).

[Formula 5]

$$a = \frac{W_n^2 - W_{n-1}^2}{2DW_n} \quad (5)$$

The acceleration a between the two points is known from above, and the travel speed W after t seconds since start at the weld line position detection point $T_{n-1}$ is obtained using the following equation, based on the above basic equation (1).

[Formula 6]

$$W = W_{n-1} + at \quad (6)$$

Further, the respective moving speeds (VX, VY, VZ) of the tip of the welding wire 211 in three directions (X direction, Y direction, Z direction) after t seconds since start at the weld line position detection point $T_{n-1}$ are velocity components in three directions of the travel speed W, as shown in FIG. 8B. The velocity components in the directions are expressed by the following equations obtained by multiplying ratios of the moving distances $VDX_n$, $VDY_n$, $VDZ_n$ in three directions with respect to the welding distance $DW_n$ by the travel speed W.

[Formula 7]

$$VX = \frac{VDX_n}{DW_n} \cdot W \quad (7)$$

[Formula 8]

$$VY = \frac{VDY_n}{DW_n} \cdot W \quad (8)$$

[Formula 9]

$$VZ = \frac{VDZ_n}{DW_n} \cdot W \quad (9)$$

From the above, the equations (7), (8) and (9) can be obtained that control the moving speeds (VX, VY, VZ) in three directions of the robot main body 110 between the two points of $T_{n-1}$ and $T_n$ so that the travel speed reaches the travel speed $W_n$ at the weld line position detection point $T_n$ after welding starts at the weld line position detection point $T_{n-1}$ at the travel speed $W_{n-1}$.

Figure 7B:
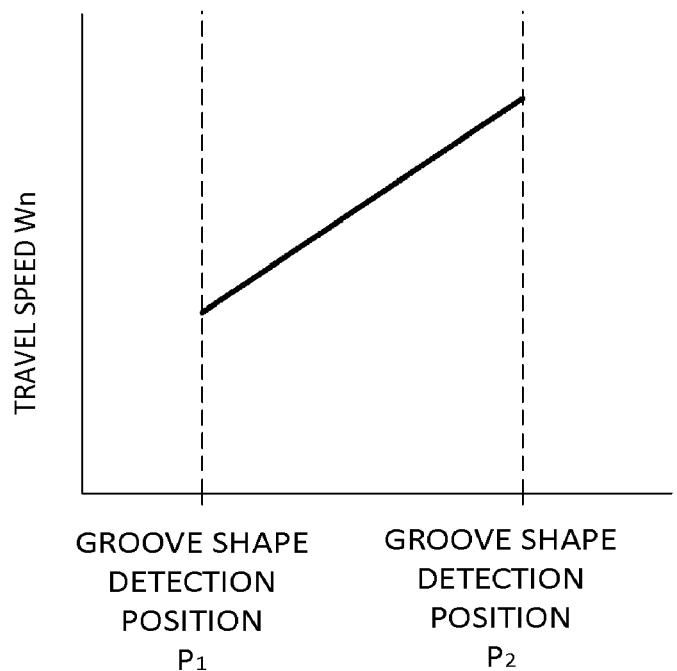
FIG. 7B is a graph illustrating a change in travel speed in the welding control method of the present invention, in a case where control is performed such that the travel speed changes in a linear manner.

As described, since the moving speeds (VX, VY, VZ) in three directions of the robot main body 110 between the adjacent groove shape detection positions $P_n$ can be calculated in advance, the calculation result is held in the data holding unit 601, and driving of the robot main body 110 is controlled based on the calculation result. As a result, by applying these equations, the tip (the position considered as the arc point in actual welding) of the welding wire 211 of the robot main body 110 has the travel speed $W_n$ changed as shown in FIG. 7B, and in the welding groove between the two points $T_{n-1}$ and $T_n$, the travel speed $W_n$ changes in accordance with the change in the groove shape and the height of the weld metal in the welding groove is kept constant.

Here, the effects of the present embodiment will be described with reference to FIG. 8D. FIG. 8D shows cross-sectional shapes of welds when the present embodiment is applied, and is a diagram for illustrating the effects of the present embodiment. In FIG. 8D, cross-sectional shapes after the welding of the groove shape detection position $P_0$ ($P_s$) on a welding start side and the groove shape detection position $P_5$ ($P_e$) on a welding end position side shown in FIG. 4A are compared as representative examples. Note that circled numbers 1 to 3 in the drawing indicate an order of welding, and a boundary line in the groove 10 indicates a boundary of the weld metal.

As shown in the drawing, the gap G differs at the groove shape detection positions $P_0$ and $P_5$, and groove shapes are different, but in the present embodiment, a height of the weld metal in the same welding order ($D_1$, $D_2$, $D_3$) can be made constant at the groove shape detection positions $P_0$ and $P_5$ regardless of a size of the gap G. Then, the height of the weld metal in the same welding order can be made constant in the same manner at the other groove shape detection positions $P_1$ to $P_4$. That is, the travel speed is set such that the height of the weld metal in the welding groove is the same at the groove shape detection positions $P_n$ ($P_0$ to $P_5$). Between the groove shape detection positions $P_n$, the travel speed is smoothly changed between adjacent groove shape detection positions $P_n$ by applying the equations (7), (8), and (9) that are control equations of the moving speeds in three directions of the robot main body 110 described above, whereby the height of the weld metal constant in the groove can be obtained even between the adjacent groove shape detection positions $P_n$.

As a result, in the final finish (a weld bead indicated by a circled number 3 in the drawing), regardless of the size of the gap G over an entire length of a weld length, a bead width m becomes equal to or greater than a groove width without causing undercut or an overlap defect, a weld reinforcement height h passing a welding quality standard can also be ensured regardless of the size of the gap G, and it is possible to perform highly accurate welding with good welding quality. In addition, it is possible to obtain the same effects, regardless of changes in the groove shape including the change in the gap G and a change in inclination of the groove side surfaces (groove walls) 11 and 12.

Figure 8E:
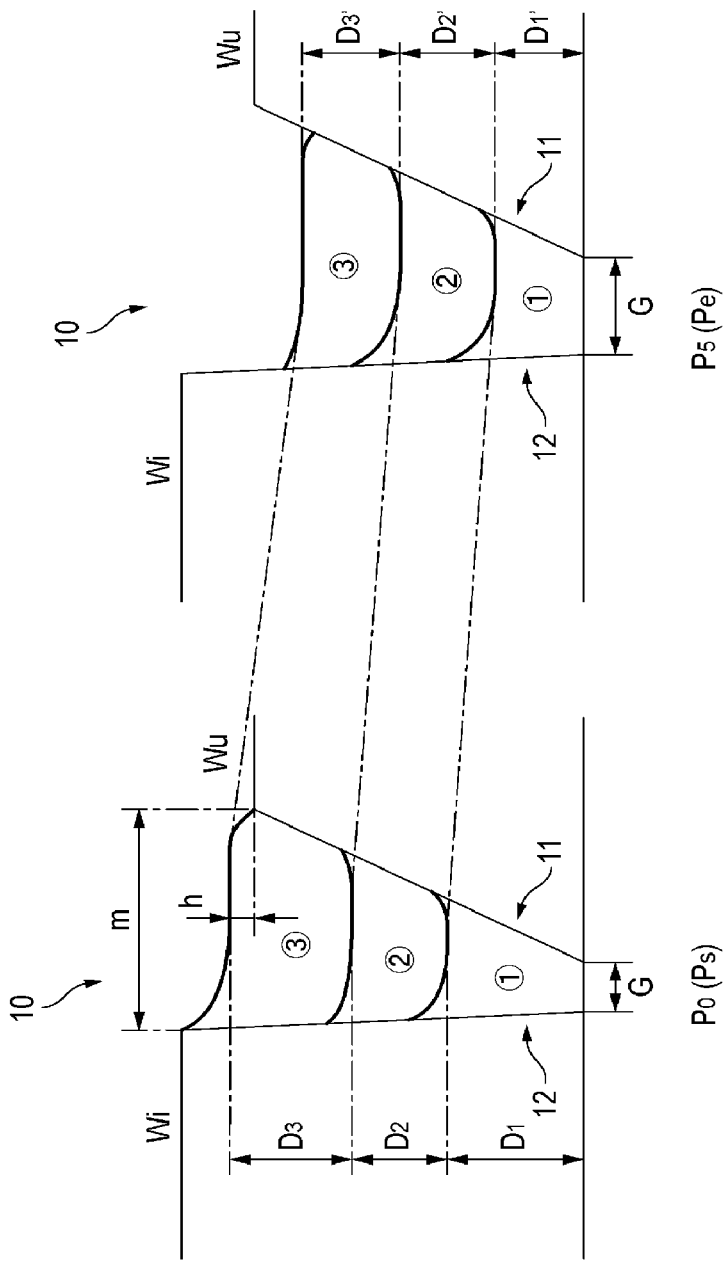
FIG. 8E shows cross-sectional shapes of welds when the present embodiment is not applied, and is a diagram for illustrating poor welding when the present embodiment is not applied.

On the other hand, FIG. 8E shows cross-sectional shapes after the welding of the groove shape detection positions $P_0$ and $P_5$ in a case where the travel speed is constant, without applying the present embodiment. That is, the welding is performed with a constant travel speed obtained based on the groove shape information calculated based on the detection data of the groove shape detection position $P_0$. As described, although good welding is performed at the groove shape detection position $P_0$ on the welding start side, the height of the weld metal in the same welding order is not constant and is changed ($D_1 \to D_1'$, $D_2 \to D_2'$, $D_3 \to D_3'$) at the groove shape detection position $P_5$ on the welding end side where the gap G is increased, the inside of the groove cannot be filled with the weld metal, and poor welding is induced. In a continuous weld whose groove shape differs according to place, a volume per unit length in a direction of welding surrounded by the groove naturally differs, and if a deposition amount of the weld metal is not controlled in accordance with this volume change, poor welding is induced as shown in FIG. 8E.

An amount of metal melted from the welding wire 211 is substantially determined by a welding current and a voltage. In the present embodiment, the amount of metal melted from the welding wire 211 is fixed (the welding current and the voltage are constant), and the height of the weld metal deposited in the groove can be kept constant, by controlling the travel speed in accordance with the change in the volume per unit length in the direction of welding surrounded by the groove.

In addition, when the maximum value maxΔd of the relative distance between the weld line WL and the welding trajectory line TWL shown in FIG. 4C is equal to or less than two times of the welding wire diameter, the travel speed W and the welding distance $DW_n$ may be regarded as the same as the moving speed VX and the moving distance $VDX_n$ in a traveling direction (X direction) of the robot main body 110. In this case, since [VX=W] is satisified, if an acceleration in the X direction is ax, the following equation is obtained based on the basic equation (3).

[Formula 10]

$$ax = \frac{W_n^2 - W_{n-1}^2}{2VDX_n} \quad (10)$$

In addition, the moving speed in the X direction is expressed by the following equation based on the basic equation (1).

[Formula 11]

$$VX = W_{n-1} + ax \cdot t \quad (11)$$

The moving distances $VDY_n$ and $VDZ_n$ in the Y direction and the Z direction are regarded as short distances, and the moving speeds VY and VZ in the Y direction and the Z direction are expressed by the following equations, assuming as movements at constant speeds.

[Formula 12]

$$VY = \frac{VDY_n}{t_n} \quad (12)$$

[Formula 13]

$$VZ = \frac{VDZ_n}{t_n} \quad (13)$$

Here, the welding time $t_n$ is expressed by the following equation based on the basic equation (1) and the equation (10).

[Formula 14]

$$t_n = \frac{2VDX_n}{W_n + W_{n-1}} \quad (14)$$

If the maximum value maxΔd of the relative distance between the weld line WL and the welding trajectory line TWL shown in FIG. 4C is equal to or less than two times of the welding wire diameter, even when the equation (11), the equation (12), and the equation (13) are simply used for controlling the moving speeds in three directions of the robot main body 110, the same effects as those obtained when the equation (7), the equation (8), and the equation (9) are used can be obtained.

[Method of Obtaining Moving Speed in Each of Three Directions in Case of Curved Guide Rail]

First, with reference to FIGS. 9A to 9D, a method of obtaining the travel speed W in the control of the travel speed between the weld line position detection points $T_n$ on the curved guide rail 120 shown in FIGS. 4D and 4E will be described below. A method of obtaining a moving speed in each of three directions of the X direction, the Y direction, and the Z direction will be described thereafter.

Figure 9A:
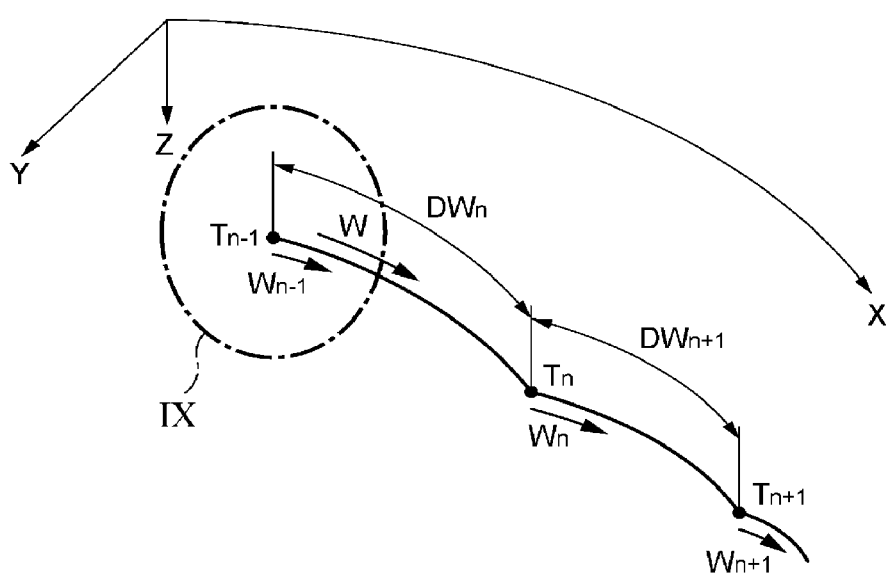
FIG. 9A is an illustrative diagram of a travel speed and a welding distance when a welding wire tip of a welding torch of a portable welding robot on a curved guide rail moves between weld line position detection points.
Figure 9B:
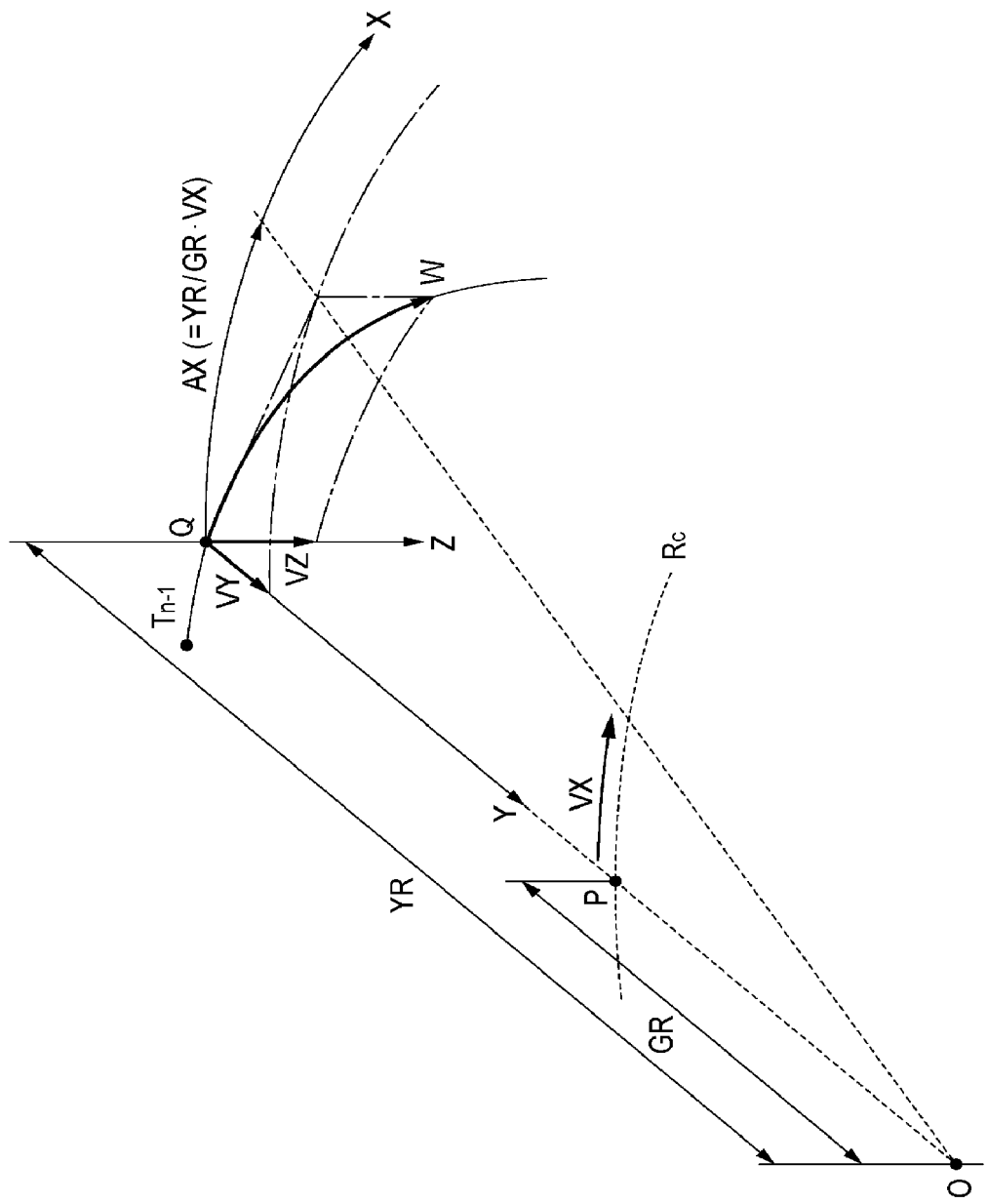
FIG. 9B is an illustrative diagram for illustrating the travel speed, obtained by enlarging an IX portion shown in FIG. 9A.
Figure 9C:
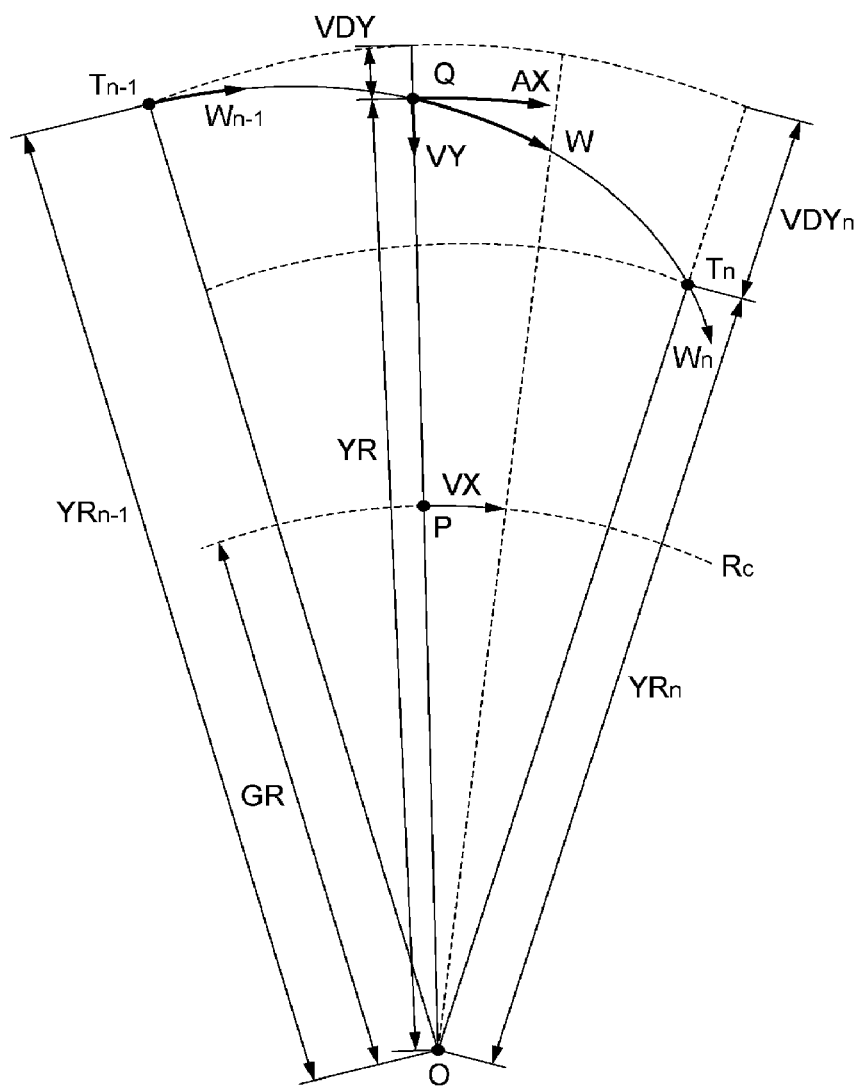
FIG. 9C is an illustrative diagram for illustrating the travel speed by showing FIG. 9B on an XY plane.
Figure 9D:
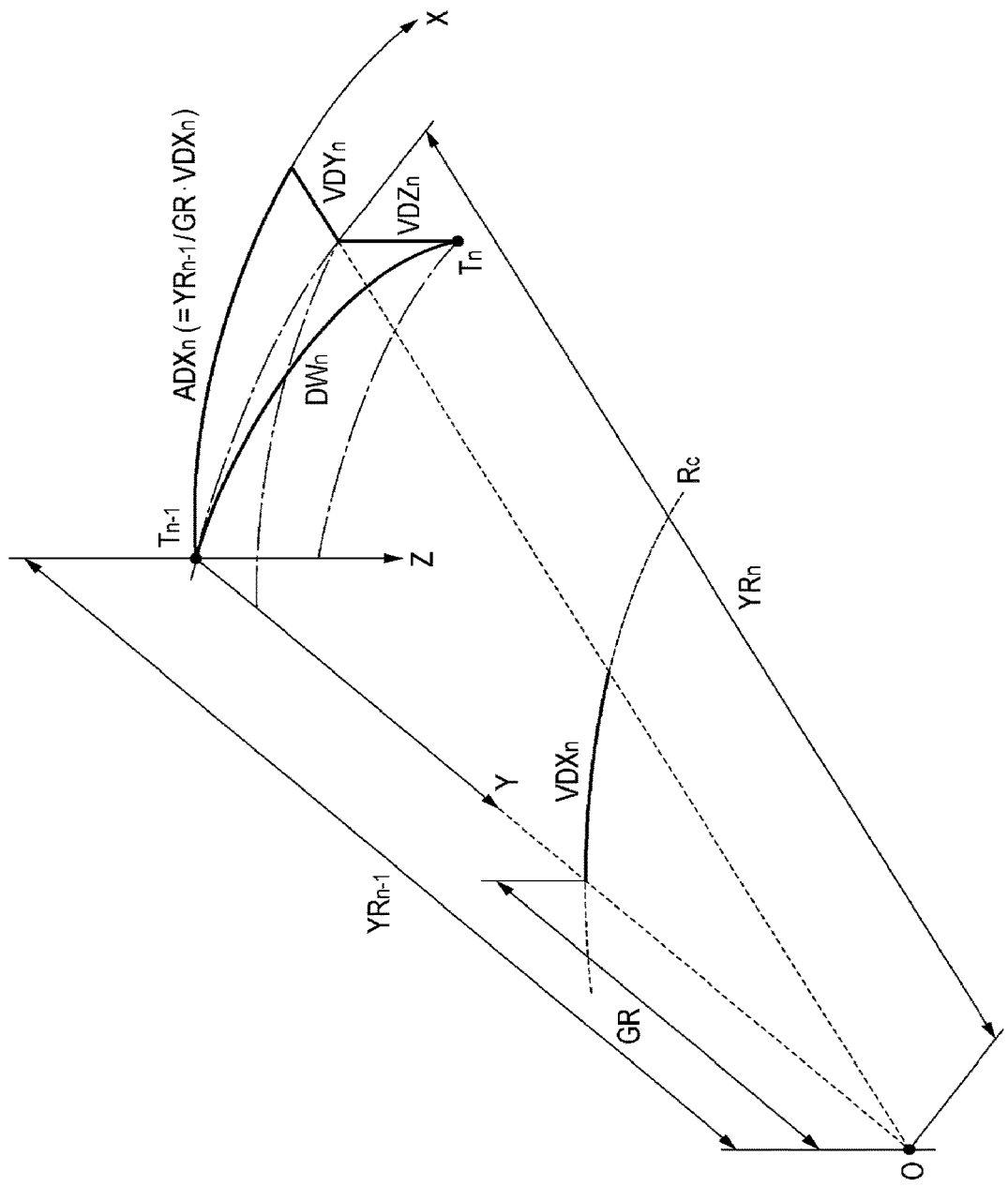
FIG. 9D is an illustrative diagram of a moving distance when the welding wire tip of the welding torch of the portable welding robot on the curved guide rail moves between the weld line position detection points.

FIG. 9A is an illustrative diagram of the travel speed W and the welding distance $DW_n$ when the tip of the welding wire 211 of the robot main body 110 on the curved guide rail 120 moves between the weld line position detection points $T_n$. FIG. 9B is a diagram obtained by enlarging an IX portion shown in FIG. 9A, and illustrates a relationship between the travel speed W at an arbitrary point between the weld line position detection points $T_n$ ($T_{n-1}$ to $T_n$), moving speeds (AX, VY, VZ) in three directions (X direction, Y direction, and Z direction) of the tip of the welding wire 211 of the robot main body 110, and a traveling speed (VX) of the robot main body traveling on the curved guide rail 120. FIG. 9C is a diagram showing FIG. 9B on an XY plane. FIG. 9D is an illustrative diagram illustrating a relationship between the welding distance $DW_n$, moving distances ($ADX_n$, $VDY_n$, $VDZ_n$) in three directions (X direction, Y direction, and Z direction) of the tip of the welding wire 211 of the robot main body 110, and a traveling distance ($VDX_n$) of the robot main body traveling on the curved guide rail 120.

First, reference signs and symbols in the expression shown in FIGS. 9A to 9D will be described.

VX: the moving speed of the robot main body 110 traveling on the guide rail 120 when the tip of the welding wire 211 of the robot main body 110 moves from the weld line position detection point $T_{n-1}$ to $T_n$ AX: the moving speed in the X direction when the tip of the welding wire 211 of the robot main body 110 moves from the weld line position detection point $T_{n-1}$ to $T_n$ $VDX_n$: the moving distance of the robot main body 110 traveling on the guide rail 120 when the tip of the welding wire 211 of the robot main body 110 moves from the weld line position detection point $T_{n-1}$ to $T_n$, and the detection data obtained in the sensing step $ADX_n$: the moving distance in the X direction when the tip of the welding wire 211 of the robot main body 110 moves from the weld line position detection point $T_{n-1}$ to $T_n$ GR: a radius of the curved guide rail, and a numerical value input to the welding condition acquisition unit 603 in advance O: a curvature center of a curved portion $YR_{n-1}$: a distance on the XY plane from the weld line position detection point $T_{n-1}$ to the curvature center O, and detection data obtained in the sensing step YR: a distance on the XY plane from a point (point Q in the drawing), at which the tip of the welding wire 211 of the robot main body 110 is located after t seconds since welding start at the weld line position detection point $T_{n-1}$, to the curvature center O VDY: the moving distance in the Y direction at the point (point Q in the drawing) at which the tip of the welding wire 211 of the robot main body 110 is located after t seconds since welding start at the weld line position detection point $T_{n-1}$ Note that the other symbols are the same as those in FIGS. 8A, 8B, and 8C.

The moving speed and the moving distance, in the X direction, of the tip of the welding wire 211 of the robot main body 110 are equal to the moving speed and the moving distance of the robot main body 110 respectively in the case of the linear guide rail described above. But since a difference occurs in the case of the curved guide rail, a relationship thereof will be described for distinguishing. That is, as shown in FIGS. 9B, 9C, and 9D, the following relational expressions are established between: the moving speed VX and the moving distance $VDX_n$ in the traveling direction of the robot main body 110 traveling on the curved guide rail about the curvature center O; and the moving speed AX and the moving distance $ADX_n$ in the X direction of the tip of the welding wire 211 of the robot main body 110 respectively, with respect to a ratio of the distance (YR and $YR_{n-1}$) between the tip of the welding wire 211 of the robot main body 110 and the curvature center O on the XY plane to the guide rail radius GR.

[Formula 15]

$$AX = \frac{YR}{GR} \cdot VX \tag{14'}$$

[Formula 16]

$$ADX_n = \frac{YR_{n-1}}{GR} \cdot VDX_n \tag{14''}$$

In addition, as shown in FIG. 9C, $YR_{n-1}$, YR and VDY satisfy the following relational expression.

[Formula 17]

$$YR_{n-1} = YR + VDY \tag{14'''}$$

From the above, similarly to the case of the curved guide rail, a formula for controlling the moving speed of the tip of the welding wire 211 in three directions (X direction, Y direction, Z direction) of the robot main body 110 can be obtained by the following formula after obtaining the travel speed.

From FIG. 9D, the welding distance $DW_n$ between two points $T_{n-1}$ and $T_n$ is obtained approximately by synthesis of $ADX_n$, $VDY_n$, and $VDZ_n$. Further, when the equation (14") is also substituted, the welding distance $DW_n$ is obtained in the same manner as with the equation (4), and the welding distance $DW_n$ is expressed by the following equation.

[Formula 18]

$$DW_n = \left( \left( \frac{YR_{n-1}}{GR} \cdot VDX_n \right)^2 + VDY_n^2 + VDZ_n^2 \right)^{1/2} \tag{15}$$

Using the equation (15), the acceleration a of the travel speed, and the travel speed W after t seconds since welding start at the weld line position detection point $T_{n-1}$ are expressed by the following equations similar to the equations (5) and (6).

[Formula 19]

$$a = \frac{W_n^2 - W_{n-1}^2}{2DW_n} \tag{15'}$$

[Formula 20]

$$W = W_{n-1} + at \tag{15''}$$

Next, the moving speeds (AX, VY, VZ) in three directions of the tip of the welding wire 211 of the robot main body 110 are obtained based on the travel speed W. As shown in FIG. 9B, the moving speeds (AX, VY, VZ) in three directions of the tip of the welding wire 211 of the robot main body 110 are velocity components in three directions of the travel speed W. The velocity components in the three directions are expressed by the following equations obtained by multiplying each of ratios of the moving distances $ADX_n$, $VDY_n$, $VDZ_n$ in three directions to the welding distance $DW_n$ by the travel speed W.

[Formula 21]

$$AX = \frac{ADX_n}{DW_n} \cdot W \tag{16}$$

[Formula 22]

$$VY = \frac{VDY_n}{DW_n} \cdot W \tag{17}$$

[Formula 23]

$$VZ = \frac{VDZ_n}{DW_n} \cdot W \tag{18}$$

The moving speeds VY and VZ in the Y direction and the Z direction of the tip of the welding wire 211 of the robot main body 110 are the same as the moving speeds in the Y direction and the Z direction of a drive portion of the main body portion 112 since the drive portion of the main body portion 112 and the welding torch 200 are directly connected to each other. With respect to the moving speed AX of the equation (16), when the equation (14'), the equation (14"), and the equation (14''') are substituted and rearranged, the moving speed VX in the traveling direction of the robot main body 110 is obtained and is expressed by the following equation.

[Formula 24]

$$VX = \frac{VDX_n}{DW_n} \cdot \frac{YR_{n-1}}{YR_{n-1} - VDY} \cdot W \tag{18'}$$

Since the moving speed in the Y direction is obtained by the equation (17), the VDY in the equation (18') (the moving distance in the Y direction at the point where the tip of the welding wire 211 is located after t seconds) is expressed by the following equation that is obtained by rearrangement using the basic equation (2).

[Formula 25]

$$VDY = \frac{VDY_n}{DW_n} \cdot \left( W_{n-1} \cdot t + \frac{1}{2} at^2 \right) \tag{18''}$$

From the above, similarly to the case of linear guide rail 120, the equations (17), (18) and (18') can be obtained that control the moving speeds (VX, VY, VZ) in three directions of the robot main body 110 between the two points of $T_{n-1}$ and $T_n$ so that the travel speed reaches the travel speed $W_n$ at the weld line position detection point $T_n$ after welding starts at the weld line position detection point $T_{n-1}$ at the travel speed $W_{n-1}$. As described, since the moving speeds (VX, VY, VZ) in three directions of the robot main body 110 between the adjacent groove shape detection positions $P_n$ can be calculated in advance, the calculation result is held in the data holding unit 601, and driving of the robot main body 110 is controlled based on the calculation result. As a result, the travel speed $W_n$ changes as shown in FIG. 7A, and in the welding groove between the two points $T_{n-1}$ and $T_n$, the travel speed $W_n$ changes in accordance with the change in the groove shape, the height of the weld metal in the welding groove is kept constant, and the same effects as those shown in FIG. 8D are obtained. Further, in the final finish, it is possible to obtain a weld joint in which the width and the weld reinforcement height of the weld metal pass the welding quality standard, and it is possible to perform welding with high accuracy.

In addition, when the maximum value max$\Delta$d of the relative distance between the weld line WL and the welding trajectory line TWL shown in FIG. 4E is equal to or less than two times of the welding wire diameter, the travel speed W and the welding distance $DW_n$ may be considered to be the same as the moving speed AX and the moving distance $ADX_n$ in the X direction when the tip of the welding wire 211 of the robot main body 110 moves from the weld line position detection point $T_{n-1}$ to $T_n$. In this case, since [AX=W] is satisfied, if the acceleration when the tip of the welding wire 211 of the robot main body 110 moves in the X direction is ax, the following expression is obtained based on the basic equation (3).

[Formula 26]
$$ax = \frac{W_n^2 - W_{n-1}^2}{2ADX_n} \quad (19)$$

When the equation (14") is substituted, the acceleration ax is expressed by the following equation.

[Formula 27]
$$ax = \frac{W_n^2 - W_{n-1}^2}{2 \cdot \frac{YR_{n-1}}{GR} \cdot VDX_n} \quad (20)$$

When AX is obtained based on the basic equation (1) using the equation (20), and the equation (14') and the equation (14''') are substituted, the moving speed VX in the traveling direction of the robot main body 110 is obtained by the following equation.

[Formula 28]
$$VX = \frac{GR}{YR_{n-1} - VDY} \cdot (W_{n-1} + ax \cdot t) \quad (21)$$

The moving distances $VDY_n$ and $VDZ_n$ in the Y direction and the Z direction are regarded as short distances, and the moving speeds VY and VZ in the Y direction and the Z direction are expressed by the following equations, assuming as movements at constant speeds.

[Formula 29]
$$VY = \frac{VDY_n}{t_n} \quad (22)$$

[Formula 30]
$$VZ = \frac{VDZ_n}{t_n} \quad (23)$$

Here, the welding time $t_n$ is expressed by the following equation based on the basic equation (1) and the equation (20).

[Formula 31]
$$t_n = \frac{2\left(\frac{YR_{n-1}}{GR}\right) \cdot VDX_n}{W_n + W_{n-1}} \quad (24)$$

In addition, since the moving speed is obtained by the equation (22), the VDY of the equation (21) (the moving distance in the Y direction at the point where the tip of the welding wire 211 is located after t seconds) is expressed by the following equation.

[Formula 32]
$$VDY = \frac{VDY_n}{t_n} \cdot t \quad (24')$$

As described, if the maximum value max$\Delta$d of the relative distance between the weld line WL and the welding trajectory line TWL shown in FIG. 4E is equal to or less than two times of the welding wire diameter, even when the equation (21), the equation (22), and the equation (23) are simply used for controlling the moving speeds in three directions of the robot main body 110, the same effects as those obtained in a case where the equation (17), the equation (18), and the equation (18') are used can be obtained.

As described above, even when the linear and curved guide rails are used for welding in which the groove 10 meanders and the groove shape changes, the welding can be performed along the weld line WL by the portable welding robot 100, in which the height of the weld metal in the welding groove is kept constant in accordance with the change in the groove shape, and good welding quality is obtained. In the final finish of the weld joint, a weld joint that passes the welding quality standard can be secured with the width and the weld reinforcement height of the weld metal, and highly accurate welding can be performed.

Figure 10:
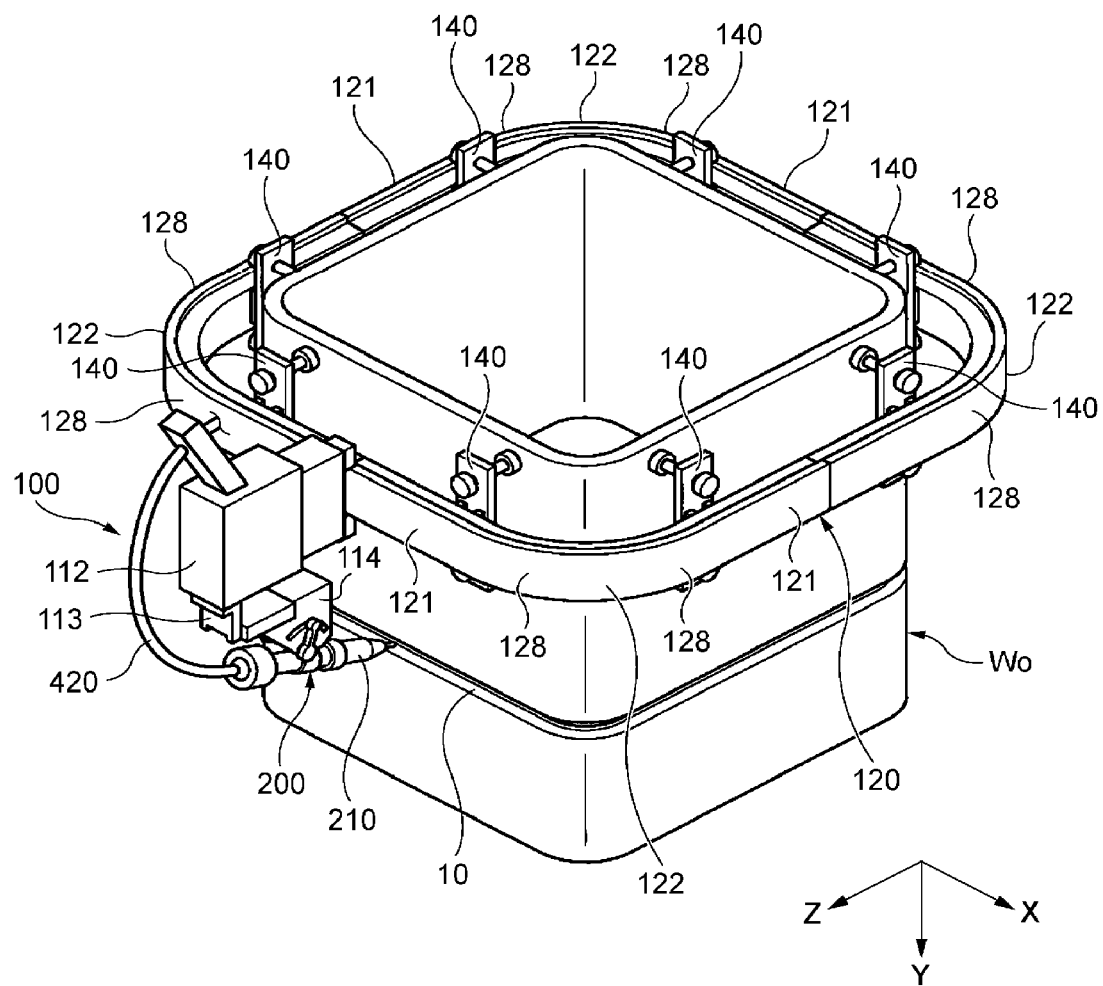
FIG. 10 is a perspective view of the welding robot shown in FIG. 3 in a case of being attached to a rectangular steel pipe.

Next, FIG. 10 showing an embodiment of the present invention is a perspective view of the portable welding robot 100 shown in FIG. 3 in a case of being attached to a rectangular steel pipe. As shown in FIG. 10, the guide rail 120 is attached to an outer surface of the steel pipe along a circumferential direction with respect to the workpiece $W_o$ of the polygonal steel pipe. In this case, the guide rail 120 is provided so as to go around the outer surface of the steel pipe via the attachment member 140, and has a shape having a linear portion 121 and a curved portion 122. Further, the portable welding robot 100 is mounted on the guide rail 120 with the welding torch 200 directed downward.

The guide rail 120 shown in FIG. 10 has a boundary region 128 where a guide route changes between the linear portion 121 and the curved portion 122. In this case, the groove shape detection position $P_n$ (including the weld line position detection point $T_n$) is set to include a position corresponding to the boundary region 128. Thus, groove shape information corresponding to the boundary region 128 can be acquired.

In the embodiment of the present invention, it is preferable that at least one groove shape detection position $P_n$ is provided in the boundary region 128 where a guide route for the portable welding robot 100 by the guide rail 120 changes, and a section for controlling welding conditions is provided immediately before or immediately after the groove shape detection position $P_n$ provided in the boundary region 128.

Figure 11:
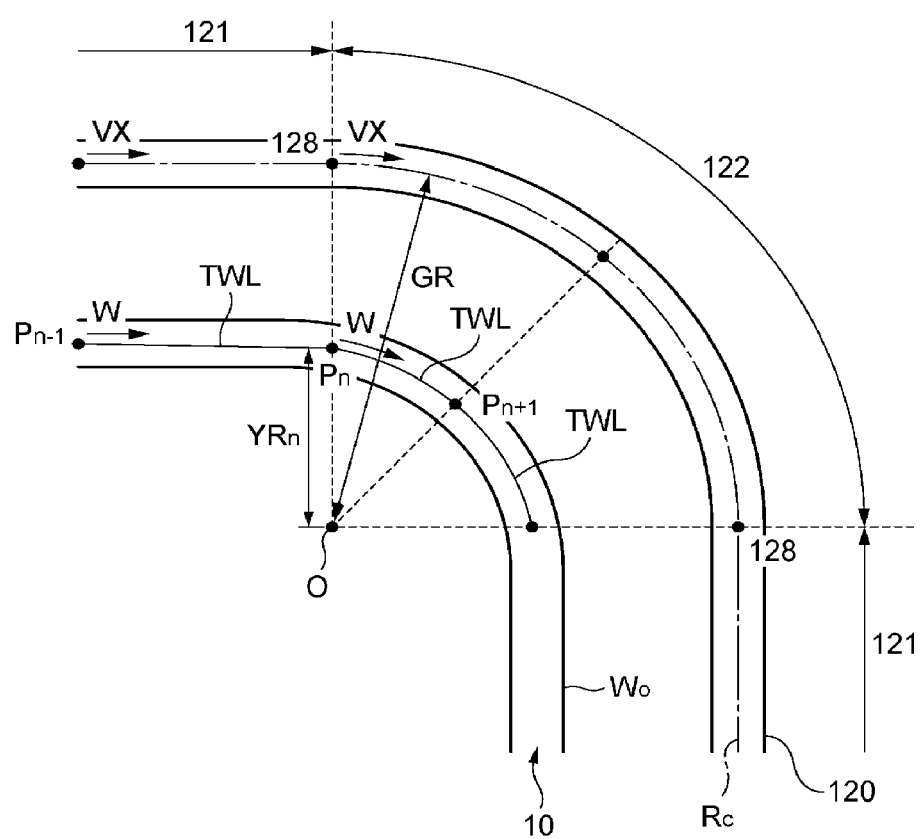
FIG. 11 is a diagram for illustrating a positional relationship between a guide rail and a groove in a region of ¼ corner of the guide rail and the rectangular steel pipe when

FIG. 11 shows a positional relationship between the guide rail 120 and the groove 10 in a region of ¼ corner of the guide rail 120 and the rectangular steel pipe when FIG. 10 is viewed from directly above. When the robot main body 110 travels from the linear portion 121 toward the curved portion 122, the travel speed W is the same as the moving speed VX in the traveling direction (X direction) of the robot main body 110 in the linear portion 121, but since the robot main body 110 travels around the curvature center O of the curved portion 122 after passing through the boundary region 128, it is necessary to rapidly change the moving speed in the traveling direction of the robot main body 110 by [GR/YR$_n$] in order to keep the travel speed W smooth at the boundary region 128 (at the groove shape detection portion $P_n$ in the drawing).

In the present embodiment, in order to avoid a rapid change in the moving speed VX in the X direction of the robot main body 110, a section for controlling welding conditions is provided immediately before or immediately after the groove shape detection position $P_n$ provided in the boundary region 128 so that a height of a weld metal in the groove 10 becomes constant before and after the boundary region 128 even if the moving speed VX is not rapidly changed. In addition, if at least one groove shape detection position $P_n$ is not provided in the boundary region 128, a position where the moving speed VX is rapidly changed is not known, and the welding conditions before and after the boundary region 128 cannot be controlled, resulting in unstable welding.

That is, in the present embodiment, it is possible to collect data in response to a change of a position of the guide route of the guide rail 120 having the linear portion 121 and the curved portion 122 as shown in FIG. 10, more accurate detection data can be acquired, and highly accurate welding control is possible with which the height of the weld metal in the groove 10 is constant.

Next, a method of obtaining the travel speed $W_n$ and the moving speeds (VX, VY, VX) in three directions of the robot main body 110 in a case where the travel speed $W_n$ is changed in a stepwise manner as shown in FIG. 7C will be described with reference to FIG. 12, as an example in a case where the linear guide rail in FIG. 4B is used.

Figure 12:
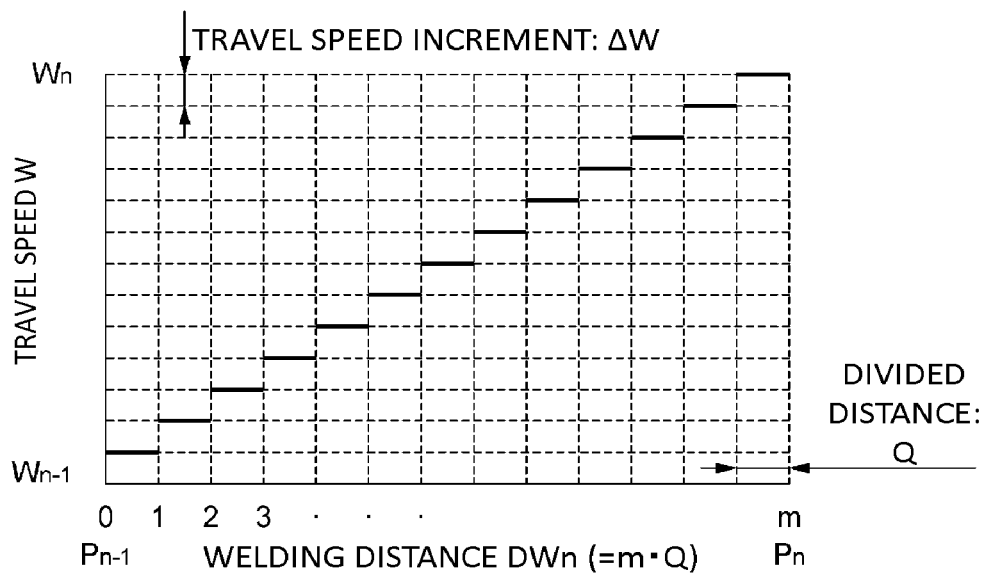
FIG. 12 is a graph showing a relationship between a moving distance (=welding distance) of a welding wire tip of a welding torch of a portable welding robot and a travel speed, when the moving distance is equally divided in the welding control method of the present invention.

As shown in FIG. 12, control is performed so as to change the travel speed in a stepwise manner so that, with respect to a horizontal axis on which the welding distance $DW_n$ is equally divided, the travel speed is constant in each equally divided distance. First, the welding distance $DW_n$ is divided by a predetermined divided distance Q to obtain a division number m.

[Formula 33]

$$m = \frac{DW_n}{Q} \quad (25)$$

The division number m is an integer value obtained by rounding off the equation (25).

Next, a difference in the travel speed between adjacent weld line position detection positions ($P_{n-1}$, $P_n$) is divided by the division number m to obtain a travel speed $\Delta W$ that is an increment for each divided distance Q.

[Formula 34]

$$\Delta W = \frac{W_n - W_{n-1}}{m} \quad (26)$$

Along a vertical axis of FIG. 12, the travel speed increases by an increment $\Delta W$ of the travel speed every time the ordinal number of the divided distance increases until m, and the travel speed is made constant over each divided distance Q. This is expressed by the following equation.

[Formula 35]

$$W = W_{n-1} + k \cdot \Delta W \quad (27)$$

Here, k is an integer value of 0 to m.

Accordingly, it is possible to obtain a control graph of the stepwise travel speed between the weld line position detection points $T_n$ shown in FIG. 12. However, the divided distance Q is set such that the increment $\Delta W$ of the travel speed falls within a range that does not affect the welding.

Similarly, when the moving speeds (VX, VY, VZ) in three directions (X, Y, Z) of the robot main body 110 are also divided by the division number m and are obtained as with the equation (27), and the vertical axis of FIG. 12 is replaced with the moving speeds in three directions (X, Y, Z), a control graph of the moving speeds in three directions (X, Y, Z) of the robot main body 110 can be obtained. By control of the stepwise moving speeds in three directions (X, Y, Z) of the robot main body 110 thus obtained, the control of the stepwise travel speed shown in FIG. 12 can be performed.

In this way, by regarding the travel speeds between the weld line position detection positions ($P_{n-1}$, $P_n$) as a set of constant speeds that change in a stepwise manner, the control of the portable welding robot 100 can be easily handled. As described above, in the control method of the travel speed such as those shown in FIGS. 7A and 7B, it is necessary to obtain the acceleration of the travel speed or the like and to express the acceleration of the travel speed or the like in a formula in advance. However, in a control method of changing the travel speed in a stepwise manner as shown in FIG. 7C, control data can be acquired only by calculating, using a simple formula, detection data obtained in the sensing step and information of the travel speed ($W_{n-1}$, $W_n$) at the weld line position detection position ($P_{n-1}$, $P_n$) calculated by the welding condition acquisition unit 603. In addition, the control method is effective in weaving welding described later.

Figure 13:
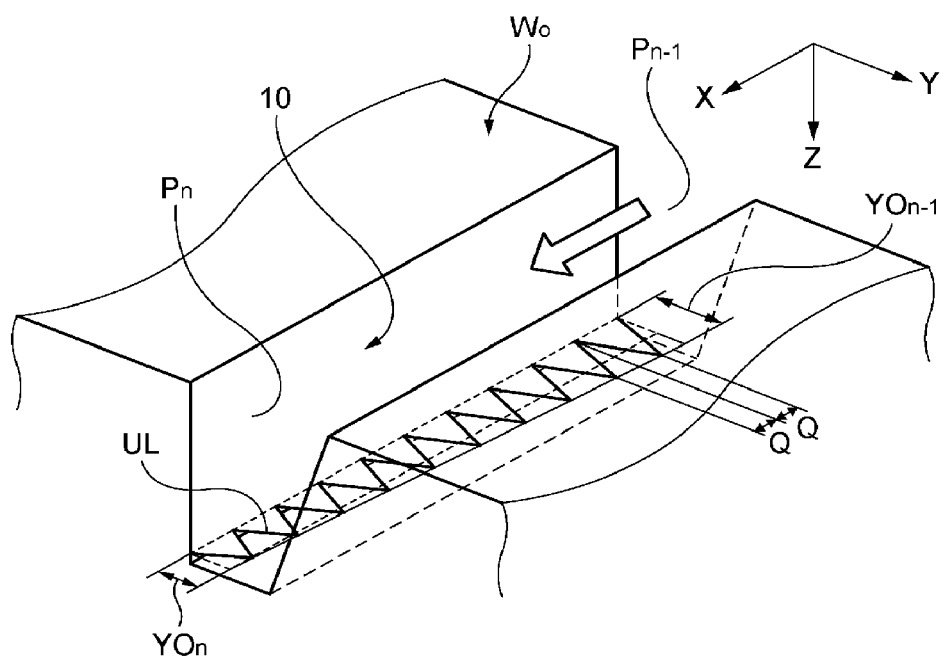
FIG. 13 is a schematic perspective view for illustrating weaving in the welding control method of the present invention.

Since the root gap G is present in the welding groove as shown in FIG. 5, a sufficient penetration width toward directions of both groove side surfaces 11 and 12 is secured in welding, and the welding torch 200 is swung in the root gap G while the robot main body 110 moves in the X direction so that the weld metal in the groove is at a constant height with respect to the welding direction, that is, weaving welding as shown in FIG. 13 is performed. In FIG. 13, a saw-tooth shaped trajectory is a weaving line UL, and moving distances $YO_{n-1}$ and $YO_n$ in the Y direction of the weaving line UL indicate weaving widths. The moving distances $YO_{n-1}$ and $YO_n$ in the Y direction are set according to sizes of the root gap G that can be acquired at the time of groove shape detection at the groove shape detection positions ($P_{n-1}$, $P_n$), and weaving widths therebetween are set so as to gradually approach that of $YO_n$ from that of $YO_{n-1}$.

Figure 14:
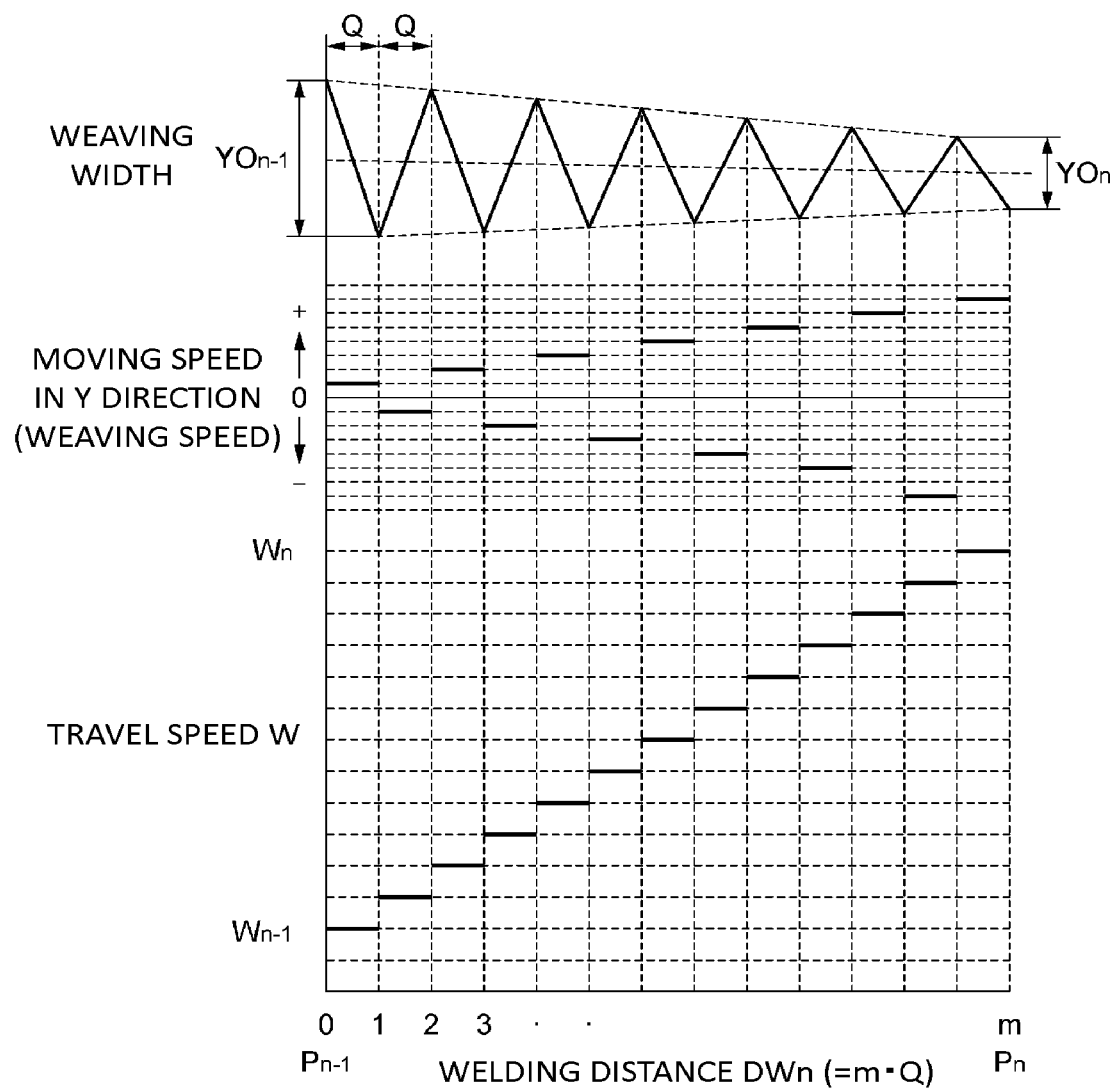
FIG. 14 is a graph showing a travel speed, a moving speed in a Y direction (=weaving speed), and a weaving width in the welding control method of the present invention.

The weaving is performed by a reciprocating motion in the Y direction of the robot main body 110, but is originally set in consideration of an amount of movement in the Y direction between the groove shape detection positions ($P_{n-1}$, $P_n$). In addition, a pitch of the weaving (a length of $2 \times Q$ in FIG. 13) is set in accordance with a timing for each divided distance Q obtained by equally dividing the welding distance $DW_n$. At this time, the control of the stepwise travel speed described above is effective. As shown in FIG. 14, a half pitch of the weaving is set for each divided distance Q, and a weaving speed over the divided distance Q (that is, the moving speed in the Y direction of the robot main body 110 and a direction thereof alternates between positive and negative) is also set to be constant. In this way, the travel speed and the weaving speed are constant speeds over the divided distance Q, and the travel speed and the weaving speed can be controlled so as to change in a stepwise manner over each divided distance Q.

In general arc welding, it is necessary to set the divided distance Q in units of several millimeters in order to secure a sufficient penetration width by weaving and to make the height of the weld metal constant. In the present embodiment, the divided distance Q is set to 1 mm to 3 mm. In addition, it is necessary to finely set an oscillation width for every half pitch of the weaving such that the oscillation width gradually approaches $YO_n$ from $YO_{n-1}$. When a length of the welding increases, the number of times of the weaving becomes enormous, and the control of the portable welding robot 100 becomes complicated.

As described above, it is possible to perform highly accurate control with no error by accurately setting and controlling the travel speed and the weaving speed to constant speeds for each divided distance Q. In site welding, depending on accuracy of assembling work of forming the groove 10, a state exists where the groove shape changes between the groove shape detection positions ($P_{n-1}$, $P_n$) and the groove 10 also meanders. Further, as described, the travel speed and the weaving speed can be accurately set and controlled to constant speeds for each divided distance Q while deviation due to guide rail installation accuracy occurs, so that good welding quality can be obtained. Position adjustment of the guide rail 120 and the portable welding robot 100 at the time of welding preparation work is facilitated, and welding with good work efficiency can be performed.

The present invention is not limited to the above-described embodiment, and may be appropriately changed as needed. For example, although one robot main body 110 is provided on the guide rail 120 in the welding system 50 of the above-described embodiment, a plurality of robot main bodies 110 may be provided.

Although sensing using a touch sensor is performed in the above-described embodiment, sensing may be performed using other laser sensors, visual sensors, or the like or a combination thereof.

Although the data used for setting the welding conditions is automatically set by automatic sensing in the above-described embodiment, the welding conditions set by the detection of each groove shape may be input to the control device 600 in advance by teaching or the like. For example, a database of the groove shape information and welding condition data may be recorded in the control device 600, and an optimum welding condition derived from the database may be automatically set based on the detection data of the groove shape obtained by sensing. In addition, the groove shape information obtained by sensing may be input to an artificial intelligence (AI) learned model subjected to learning of machine learning, deep learning, or the like, and an optimum welding condition may be output.

As described above, the present description discloses the following matters.

(1) A welding control method of a portable welding robot that moves along a guide rail for welding a workpiece having a groove, the method including:
a sensing step of setting two or more groove shape detection positions in a welding section from a welding start point to a welding end point, and sensing groove shapes at the groove shape detection positions via a detection unit provided in the portable welding robot moving on the guide rail;
a groove shape information calculation step of calculating groove shape information based on detection data obtained in the sensing step; and
a welding condition acquisition step of acquiring a welding condition based on the groove shape information.

According to the above (1), the groove shape information is acquired based on the detection data obtained at the groove shape detection position in a state where the guide rail and the portable welding robot are installed along the groove, and the welding condition is set based on the groove shape information. Therefore, a change in the groove shape for each groove shape detection position and a positional relationship between the guide rail and the groove are considered due to being included in the detection data, and the welding condition can be acquired based on an accurate numerical value. Accordingly, welding can be performed under welding control that is not affected by guide rail installation accuracy or the change in the groove shape. As a result, highly accurate welding can be performed. With respect to welding work, workpiece assembling work at the time of forming the groove shape is facilitated, position adjustment of the guide rail and the portable welding robot at the time of welding preparation work is facilitated, and welding with good work efficiency can be performed.

(2) The welding control method of a portable welding robot according to (1),
in which in a case where intersections of the groove shape detection positions and a predetermined weld line on the workpiece are set as weld line position detection points, and a trajectory of welding at a time when welding is performed between adj acent weld line position detection points is set as a welding trajectory line, the groove shape detection positions are set such that a maximum value of a relative distance between the weld line and the welding trajectory line is equal to or less than two times of a welding wire diameter.

According to the above (2), welding can be performed with a tolerance with respect to the originally determined weld line while maintaining good welding quality.

(3) The welding control method of a portable welding robot according to (1) or (2),
in which the welding condition is controlled so as to change in at least one of a linear manner, a stepwise manner, and a curved manner between the groove shape detection positions in accordance with a value of the welding condition acquired for each of the groove shape detection positions in a case where a change in the welding condition occurs between the groove shape detection positions.

According to the above (3), the welding condition can be changed gradually even when a difference of the welding condition is great between the groove shape detection positions, and it is possible to perform smooth welding by avoiding a rapid change in the welding condition between the groove shape detection positions. As a result, highly accurate welding can be performed.

(4) The welding control method of the portable welding robot according to (3),
in which at least one welding condition is a travel speed, and
in a case where
a moving direction of the portable welding robot is set as an X direction,
a groove width direction perpendicular to the X direction is set as a Y direction, and a groove depth direction perpendicular to the X direction is set as a Z direction,
moving speeds in three directions of the X direction, the Y direction, and the Z direction are calculated according to values of the travel speed that are acquired for the three directions at the groove shape detection positions, and
the travel speed between the groove shape detection positions is controlled according to moving speeds in the three directions.

According to the above (4), it is possible to perform control corresponding to a fine change in the groove shape by the control in each direction. In addition, since the control of the welding condition is not only the travel speed in the moving direction of the portable welding robot, it is possible to reduce the influence of welding position deviation due to the guide rail installation accuracy, the groove shape, and the like, and highly accurate welding can be performed.

(5) The welding control method of a portable welding robot according to (3),
in which at least one welding condition is a travel speed,
in a case where
a moving direction of the portable welding robot is set as an X direction,
a groove width direction perpendicular to the X direction is set as a Y direction, and
a groove depth direction perpendicular to the X direction is set as a Z direction,
moving speeds in three directions of the X direction, the Y direction, and the Z direction are calculated according to values of the travel speed that are acquired for the three directions at the groove shape detection positions,
in which a welding distance or a moving time between the groove shape detection positions is divided into two or more sections, and a travel speed of each division point is calculated according to moving speeds in the three directions at each division point, and
in which a travel speed between the groove shape detection positions is controlled such that a travel speed of each division point is constant and a travel speed between the groove shape detection positions changes in a stepwise manner.

According to the above (5), the control corresponding to fine change in the groove shape can be facilitated by the control in each direction (the X direction, the Y direction, and the Z direction). In addition, since the control of the welding condition is not only the travel speed in the moving direction of the portable welding robot, it is possible to reduce the influence of welding position deviation due to the guide rail installation accuracy, the groove shape, and the like, and highly accurate welding can be performed.

(6) The welding control method of the portable welding robot according to (2),
in which at least one of the groove shape detection positions is provided in a boundary region between a linear portion and a curved portion of the guide rail or in a boundary region where a curvature of the guide rail changes in the curved portion.

According to the above (6), since at least one of the groove shape detection positions is provided correspondingly to the boundary region where a guide route of the portable welding robot by the guide rail changes, it is possible to collect data in response to a change of a position of the guide route of the guide rail, and accurate detection data can be acquired. As a result, highly accurate welding control is possible.

(7) The welding control method of the portable welding robot according to (6),
in which a section for controlling the welding condition is provided immediately before or immediately after the groove shape detection position provided in the boundary region.

According to the above (7), the welding condition is controlled in the section for controlling immediately before or immediately after the groove shape detection position based on the detection data obtained at each groove shape detection position, so that control can be performed without impairing the welding quality at a position close to a portion where actual groove detection data is obtained, and highly accurate welding is possible.

(8) The welding control method of the portable welding robot according to any one of (1) to (7),
in which at least one of a weaving condition, a travel speed, and a welding current is selected as the welding condition, and
in which at least one of the weaving condition, the travel speed, and the welding current is controlled based on the groove shape information between the groove shape detection positions, so that a weld metal in the groove has a constant height along a welding direction.

According to the above (8), a height of a molten surface can be stabilized, and accuracy of the welding work and the welding quality can be improved.

(9) The welding control method of the portable welding robot according to any one of (1) to (8),
in which the sensing step includes sensing at least one of a workpiece surface on a side on which the groove is provided in the workpiece and a workpiece end portion in a welding direction of the workpiece, in addition to sensing of the groove shape at the groove shape detection position.

According to the above (9), not only the groove shape but also an entire shape of a periphery of the groove can be grasped. As a result, the welding condition based on more detection data can be acquired, and highly accurate welding can be performed.

(10) The welding control method of the portable welding robot according to any one of (1) to (9),
in which the sensing is touch sensing,
in which at the groove shape detection position, at least five detection points arranged along a cross section of the groove are provided on a root gap and groove side surfaces on both sides of the groove, and in which the groove shape information is calculated based on the detection data obtained from the detection point.

According to the above (10), it is possible to perform welding control in which the groove shape is accurately grasped, and it is possible to perform highly accurate welding.

(11) The welding control method of the portable welding robot according to (2),
in which the weld line is a groove end of any one of both groove side surfaces of the groove shape.

According to the above (11), it is possible to accurately and easily detect the actual shape change of the groove, and it is possible to perform quick and accurate welding control. As a result, the accuracy of welding is improved.

(12) A welding control device configured to weld a workpiece having a groove using a portable welding robot that moves along a guide rail, the welding control device including:
a groove shape information calculation unit that calculates groove shape information based on detection data obtained in a sensing step of
setting two or more groove shape detection positions in a welding section from a welding start point to a welding end point, and
sensing groove shapes at the groove shape detection positions via a detection unit provided in the portable welding robot moving on the guide rail; and
a welding condition acquisition unit that acquires a welding condition based on the groove shape information.

According to the above (12), in a state where the guide rail and the portable welding robot are installed along the groove, the welding control device can perform sensing of the groove via the detecting unit on the portable welding robot, calculate the groove shape information based on the detection data obtained by sensing, and acquire the welding condition based on the calculated groove shape information to perform the welding control. As a result, the welding control device can perform highly accurate welding control without being affected by guide rail installation accuracy or a change in the groove shape, and weldability can be improved since it is unnecessary to improve the guide rail installation accuracy.

(13) A portable welding robot that welds a workpiece having a groove while moving on a guide rail and is controlled by the welding control device according to (12), the portable welding robot including:
a detection unit that, in a state of being set on the guide rail, sets two or more groove shape detection positions in a welding section from a welding start point to a welding end point, and senses groove shapes at the groove shape detection positions.

According to the above (13), the portable welding robot has the detection unit for sensing the groove, performs the sensing of the groove via the detection unit in a state of being set on the guide rail along the groove, and is controlled based on the welding condition obtained based on the groove shape information that is calculated by the welding control device based on the detection data obtained by sensing. Therefore, highly accurate sensing can be performed without being affected by the guide rail installation accuracy or the change in the groove shape. Further, since the portable welding robot is controlled based on the welding condition acquired by the highly accurate sensing, it is possible to control the portable welding robot with high accuracy, and the welding quality can be improved. Since it is unnecessary to improve the guide rail installation accuracy for the portable welding robot, the weldability can be improved.

(14) A welding system of a portable welding robot, the welding system including:
a portable welding robot that welds a workpiece having a groove while moving on a guide rail; and
a welding control device that is capable of controlling an operation of the portable welding robot,
in which the portable welding robot includes a detection unit that sets two or more groove shape detection positions in a welding section from a welding start point to a welding end point, and that senses groove shapes at the groove shape detection positions, and
in which the welding control device includes
a groove shape information calculation unit that calculates groove shape information based on detection data obtained by the sensing, and
a welding condition acquisition unit that acquires a welding condition based on the groove shape information.

According to the above (14), in a state where the guide rail and the portable welding robot are installed along the groove, the welding system controls the welding performed by the portable welding robot according to the detection data obtained via the detection unit on the portable welding robot and the welding condition obtained based on the groove shape information calculated based on the detection data. Therefore, highly accurate welding can be performed without being affected by guide rail installation accuracy or a change in the groove shape. In addition, since it is unnecessary to increase the guide rail installation accuracy for the welding system, weldability can be improved.

Although various embodiments have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Components in the embodiments described above may be combined freely within a range not departing from the spirit of the present invention.

The present application is based on Japanese Patent Application No. 2019-145780, filed on Aug. 7, 2019, and the contents thereof are incorporated herein by reference.

REFERENCE SIGNS LIST

10 groove
$10_c$ welding end point
$10_s$ welding start point
11, 12 groove side surface
$11_e$, $12_e$ groove end edge
50 welding system
100 portable welding robot
110 robot main body
120 guide rail
121 linear portion
122 curved portion
128 boundary region
200 welding torch
211 welding wire
300 feeding device
400 welding power supply
500 shielding gas supply source
600 control device
603 welding condition acquisition unit
$DW_n$ welding distance between two points, that is, from weld line position detection point $T_{n-1}$ to $T_n$ G root gap
L distance between workpiece end portions $W_e$
$P_n$ groove shape detection position
$P_s$ first groove shape detection position
$P_e$ second groove shape detection position
T moving time
$T_n$ weld line position detection point
TWL welding trajectory line
$W_e$ workpiece end portion
$W_o$ workpiece
$W_i$, $W_u$ workpiece surface
WL welding wire

The invention claimed is:

1. A welding control method of a portable welding robot that moves along a guide rail for welding a workpiece having a groove, the method comprising:
   a sensing step of setting two or more groove shape detection positions in a welding section from a welding start point to a welding end point, and sensing groove shapes at the groove shape detection positions via a detection unit provided in the portable welding robot moving on the guide rail;
   a groove shape information calculation step of calculating groove shape information based on detection data obtained in the sensing step; and
   a welding condition acquisition step of acquiring a welding condition based on the groove shape information,
   wherein the welding condition is controlled so as to change in at least one of a linear manner, a stepwise manner, and a curved manner between the groove shape detection positions in accordance with a value of the welding condition acquired for each of the groove shape detection positions in a case where a change in the welding condition occurs between the groove shape detection positions.

2. The welding control method of the portable welding robot according to claim 1,
   wherein in a case where intersections of the groove shape detection positions and a predetermined weld line on the workpiece are set as weld line position detection points, and a trajectory of welding at a time when welding is performed between adjacent weld line position detection points is set as a welding trajectory line, the groove shape detection positions are set such that a maximum value of a relative distance between the weld line and the welding trajectory line is equal to or less than two times of a welding wire diameter.

3. The welding control method of the portable welding robot according to claim 1,
   wherein at least one welding condition is a travel speed, and in a case where
   a moving direction of the portable welding robot is set as an X direction,
   a groove width direction perpendicular to the X direction is set as a Y direction, and
   a groove depth direction perpendicular to the X direction is set as a Z direction,
   moving speeds in three directions of the X direction, the Y direction, and the Z direction are calculated according to values of the travel speed that are acquired for the three directions at the groove shape detection positions, and
   the travel speed between the groove shape detection positions is controlled according to moving speeds in the three directions.

4. The welding control method of the portable welding robot according to claim 1,
   wherein at least one welding condition is a travel speed, in a case where
   a moving direction of the portable welding robot is set as an X direction,
   a groove width direction perpendicular to the X direction is set as a Y direction, and
   a groove depth direction perpendicular to the X direction is set as a Z direction,
   moving speeds in three directions of the X direction, the Y direction, and the Z direction are calculated according to values of the travel speed that are acquired for the three directions at the groove shape detection position,
   wherein a welding distance or a moving time between the groove shape detection positions is divided into two or more sections, and a travel speed of each division point is calculated according to moving speeds in the three directions at each division point, and
   wherein a travel speed between the groove shape detection positions is controlled such that a travel speed of each division point is constant and a travel speed between the groove shape detection positions changes in a stepwise manner.

5. The welding control method of the portable welding robot according to claim 2,
   wherein at least one of the groove shape detection positions is provided in a boundary region between a linear portion and a curved portion of the guide rail or in a boundary region where a curvature of the guide rail changes in the curved portion.

6. The welding control method of the portable welding robot according to claim 5,
   wherein a section for controlling the welding condition is provided immediately before or immediately after the groove shape detection position provided in the boundary region.

7. The welding control method of the portable welding robot according to claim 1,
   wherein at least one of a weaving condition, a travel speed, and a welding current is selected as the welding condition, and
   wherein at least one of the weaving condition, the travel speed, and the welding current is controlled based on the groove shape information between the groove shape detection positions, so that a weld metal in the groove has a constant height along a welding direction.

8. The welding control method of the portable welding robot according to claim 1,
   wherein the sensing step includes sensing at least one of a workpiece surface on a side on which the groove is provided in the workpiece and a workpiece end portion in a welding direction of the workpiece, in addition to sensing of the groove shape at the groove shape detection position.

9. The welding control method of the portable welding robot according to claim 1,
   wherein the sensing is touch sensing,
   wherein at least five detection points arranged along a cross section of the groove are provided on a root gap and groove side surfaces on both sides of the groove at the groove shape detection position, and
   wherein the groove shape information is calculated based on the detection data obtained from the detection point.

10. The welding control method of the portable welding robot according to claim 2,
    wherein the weld line is a groove end of any one of both groove side surfaces of the groove shape.

11. A welding control device configured to weld a workpiece having a groove using a portable welding robot that moves along a guide rail, the welding control device comprising:
- a groove shape information calculation unit that calculates groove shape information based on detection data obtained in a sensing step of
  - setting two or more groove shape detection positions in a welding section from a welding start point to a welding end point, and
  - sensing groove shapes at the groove shape detection positions via a detection unit provided in the portable welding robot moving on the guide rail; and
- a welding condition acquisition unit that acquires a welding condition based on the groove shape information,
- wherein the welding condition is controlled so as to change in at least one of a linear manner, a stepwise manner, and a curved manner between the groove shape detection positions in accordance with a value of the welding condition acquired for each of the groove shape detection positions in a case where a change in the welding condition occurs between the groove shape detection positions.

12. A portable welding robot that welds a workpiece having a groove while moving on a guide rail and is controlled by the welding control device according to claim 11, the portable welding robot comprising:
- a detection unit that, in a state of being set on the guide rail, sets two or more groove shape detection positions in a welding section from a welding start point to a welding end point, and senses groove shapes at the groove shape detection positions.

13. A welding system of a portable welding robot, the welding system comprising:
- a portable welding robot that welds a workpiece having a groove while moving on a guide rail; and
- a welding control device that is capable of controlling an operation of the portable welding robot,
- wherein the portable welding robot comprises a detection unit that sets two or more groove shape detection positions in a welding section from a welding start point to a welding end point, and that senses groove shapes at the groove shape detection positions, and
- wherein the welding control device comprises
  - a groove shape information calculation unit that calculates groove shape information based on detection data obtained by the sensing, and
  - a welding condition acquisition unit that acquires a welding condition based on the groove shape information,
- wherein the welding condition is controlled so as to change in at least one of a linear manner, a stepwise manner, and a curved manner between the groove shape detection positions in accordance with a value of the welding condition acquired for each of the groove shape detection positions in a case where a change in the welding condition occurs between the groove shape detection positions.

14. The welding control method of the portable welding robot according to claim 2,
- wherein the welding condition is controlled so as to change in at least one of a linear manner, a stepwise manner, and a curved manner between the groove shape detection positions in accordance with a value of the welding condition acquired for each of the groove shape detection positions in a case where a change in the welding condition occurs between the groove shape detection positions.

15. The welding control method of the portable welding robot according to claim 14,
- wherein at least one welding condition is a travel speed, and in a case where
- a moving direction of the portable welding robot is set as an X direction,
- a groove width direction perpendicular to the X direction is set as a Y direction, and
- a groove depth direction perpendicular to the X direction is set as a Z direction,
- moving speeds in three directions of the X direction, the Y direction, and the Z direction are calculated according to values of the travel speed that are acquired for the three directions at the groove shape detection positions, and
- the travel speed between the groove shape detection positions is controlled according to moving speeds in the three directions.

16. The welding control method of the portable welding robot according to claim 14,
- wherein at least one welding condition is a travel speed, in a case where
- a moving direction of the portable welding robot is set as an X direction,
- a groove width direction perpendicular to the X direction is set as a Y direction, and
- a groove depth direction perpendicular to the X direction is set as a Z direction,
- moving speeds in three directions of the X direction, the Y direction, and the Z direction are calculated according to values of the travel speed that are acquired for the three directions at the groove shape detection position,
- wherein a welding distance or a moving time between the groove shape detection positions is divided into two or more sections, and a travel speed of each division point is calculated according to moving speeds in the three directions at each division point, and
- wherein a travel speed between the groove shape detection positions is controlled such that a travel speed of each division point is constant and a travel speed between the groove shape detection positions changes in a stepwise manner.

* * * * *